(12) United States Patent
Seddigh et al.

(10) Patent No.: US 7,317,731 B2
(45) Date of Patent: Jan. 8, 2008

(54) SYSTEM AND METHOD FOR DISTRIBUTED RESOURCE RESERVATION PROTOCOL-TRAFFIC ENGINEERING (RSVP-TE) HITLESS RESTART IN MULTI-PROTOCOL LABEL SWITCHING (MPLS) NETWORK

(75) Inventors: Nabil Seddigh, North Gower (CA); Biswajit Nandy, Kanata (CA); Donald William Bennett, Nepean (CA)

(73) Assignee: Tropic Networks Inc., Kanata, Ontario (CA)

( * ) Notice: Subject to any disclaimer, the term of this patent is extended or adjusted under 35 U.S.C. 154(b) by 1029 days.

(21) Appl. No.: 10/435,458

(22) Filed: May 12, 2003

(65) Prior Publication Data

US 2003/0210705 A1 Nov. 13, 2003

Related U.S. Application Data

(60) Provisional application No. 60/379,513, filed on May 13, 2002.

(51) Int. Cl.
*H04L 12/56* (2006.01)
(52) U.S. Cl. ...................... 370/419; 370/422
(58) Field of Classification Search .................. 370/419
See application file for complete search history.

(56) References Cited

U.S. PATENT DOCUMENTS 6,674,756 B1* 1/2004 Rao et al. ............... 370/395.21
2002/0141429 A1* 10/2002 Pegrum et al. ............. 370/422

OTHER PUBLICATIONS

Ashwood-Smith, P., et al., "Generalized MPLS Signaling—RSVP-TE Extensions", Draft IETF-MPLS-Generalized-RSVP-TE-07, txt, Apr. 2002.

* cited by examiner

*Primary Examiner*—Hassan Kizou
*Assistant Examiner*—Jeffrey M Rutkowski
(74) *Attorney, Agent, or Firm*—Victoria Donnelly

(57) ABSTRACT

A system of hitless restart in a network, where at least one node in the network provides routing control distributed among ingress ports (ingress cards) and egress ports (egress cards), is disclosed. With distributed routing control, each ingress card has its own routing-control software and each egress card has its own routing-control software. When the routing-software at an ingress port or an egress port of a node is restarted, current connections traversing a restarting ingress card or a restarting egress card continue to function normally during a restart period without data loss. The disclosed system is tailored to a multi-protocol label switching (MPLS) network employing distributed-resource-reservation-protocol traffic engineering (RSVP-TE). The system relies on messaging between ingress card control planes, ingress card data planes, egress card control planes, and egress card data planes of a restarting node.

24 Claims, 16 Drawing Sheets

SYSTEM AND METHOD FOR DISTRIBUTED RESOURCE RESERVATION PROTOCOL-TRAFFIC ENGINEERING (RSVP-TE) HITLESS RESTART IN MULTI-PROTOCOL LABEL SWITCHING (MPLS) NETWORK

RELATED APPLICATION

This application claims priority from U.S. patent application Ser. No. 60/379,513 filed on May 13, 2002, to Seddigh, N., et al.

FIELD OF THE INVENTION

This invention relates generally to telecommunications networks and, in particular, to a routing system and methods for distributed RSVP-TE (resource reservation protocol-traffic engineering) hitless graceful restart in MPLS (multi-protocol label switching) telecommunications network.

BACKGROUND OF THE INVENTION

Nowadays, users/customers of telecommunications networks and international regulatory bodies demand an extremely high quality of service with little or no periods of service failure or down time. Accordingly, many attempts have been made by equipment manufactures to develop the design of switching nodes that produce hitless and graceful restart when control plane software upgrade occurs in the telecommunication networks, especially in optical telecommunications networks. Graceful restart is only applicable to new generation switching nodes where the separation of data and control planes are implemented.

The RSVP (resource reservation protocol) graceful restart allows a router (a switching node) undergoing a restart to inform its adjacent neighbours of its condition. The restarting router requests a-grace period from the neighbour or peer, which can then cooperate with the restarting router. The restarting router can still forward MPLS (multi-protocol label switching) traffic during the restart period. The restart is not visible to the rest of the network. For the restarting router, the RSVP graceful restart maintains the path installed by RSVP and the allocated labels, so that traffic continues to be forwarded without disruption. This is done quickly enough to reduce or eliminate the impact on neighbouring nodes. For the router's neighbours, the neighbouring routers must have the RSVP graceful restart helper mode enabled, thus allowing those to assist a router attempting to restart RSVP.

All RSVP graceful restart procedures are timer-based for both restart and recovery. During the recovery time, a restarting node attempts to recover its lost states with assistance from its neighbours. The neighbour of the restarting node needs to send the PATH messages with the recovery labels to the restarting node within a period of one half of the recovery time. The restarting node considers its graceful restart complete after its advertised recovery time. Currently there is no way for RSVP to determine that it has completed a restart procedure, other than after a fixed timeout.

FIG. 1 of the prior art shows a telecommunications network 100 having a number of nodes, Node A 105 to Node I 145, and links, 107, 113, 117, 123, 124, 126, 129, 133, 136, 137, 139, 141, 142, 143, 144, 147, and 153, connecting the nodes. If the data forwarding between nodes is operating normally and a node control plane restarts, due to crash, software upgrade, or the control channel between a pair of nodes restarts, then all LSPs (label switched paths) traversing the node are terminated. This causes a major traffic disruption inside the network. With graceful restart, the control plane can be recovered without disrupting the data plane, that is, no disruption to data/user traffic. As shown in FIG. 1, two LSPs are going through Node C 115. One LSP is going through the links 107 from Node A 105 to Node B 110, 113 from Node B 110 to Node C 115, 117 from Node C 115 to Node D 120, and 123 from Node D 120 to Node E 125. Another LSP is going through the links 137 from Node G 135 to Node H 140, 143 from Node H 140 to Node C 115, 147 from Node C 115 to Node D 120, and 153 from Node D 120 to Node F 130. Node B 110, Node D 120, and Node H 140 have knowledge about the labels that are used for data forwarding on Node C 115. Node C 115 advertises the graceful restart capability to the neighbouring Node B 110, Node H 140, and Node D 120. If the control plane on Node C 115 has crashed and if the data forwarding is operating normally, Node B 110, Node H 140, and Node D 120 would not be impacted and will keep the LSPs running through 139, 141, 142, and 144 links intact. After detecting that Node C 115 is up again, Node B 110, Node D 120, and Node H 140 send label information to Node C 115 to help its recovery.

Prior art teaches different approaches of achieving graceful restart for traditional multi-protocol label switching (TMPLS) including state copy method, protocol method with network management system (NMS) assistance, protocol method with minimal traffic hit, and protocol method with zero traffic hit.

The state copy method copies all the LSP state information to a random access memory (RAM) that is not affected by the restart. After restart of a card, the LSP state on the card is recreated by copying it back from RAM. The drawback with this approach is that it requires up to 2000 bytes for each LSP and, as the number of LSPs grows, scalability in terms of RAM requirements becomes an issue. In addition, each time the RSVP state blocks are altered, there is a need to alter the graceful restart mechanism to ensure that the new fields in the state blocks are copied to RAM as well.

The protocol method with network management system (NMS) assistance requires NMS intervention to facilitate the graceful restart. Here, the NMS identifies all the LSPs passing through the card that is to be restarted. From the RSVP management information database, the NMS is able to identify the head node for each of these LSPs. After restart, the NMS contacts the ingress label edge router (LER) for each of the previously identified LSPs and initiates a modify operation on the LSPs. This causes the state to be recreated at the restarted card. The drawback of this method is that it requires NMS involvement and it impacts a large number of nodes in the network. The method also requires control plane to data plane binding and refresh hold-off operations.

The protocol methods with minimal or zero traffic hit recreates the RSVP protocol state in the restarted card by taking advantage of the RSVP refresh mechanism and adding some RSVP extensions. The protocol method with minimal traffic hit uses the mechanisms inherent in RSVP but results in over-written labels on one or more nodes. On the other hand, while the protocol method with zero traffic hit also relies on RSVP mechanisms, it will not over-write any labels and consequently should result in no traffic disruption in addition to re-establishing RSVP state on the restarted card. This approach binds the RSVP control plane to the existing data plane entries. The protocol methods with minimal or zero traffic implementation require that the router node has means to inform its neighbouring nodes to stop their refresh timeout mechanism during restart and means to determine when a link has gone down. The neighbouring nodes require means to send PATH messages to the restarting node on detection of restart completion. The restarted node also requires means to recreate the RSVP state at the restarting LSR, and means to bind the control plane RSVP state with the data plane LSP table entries.

FIG. 2 of the prior art illustrates the forwarding tables for LSPs on the nodes in the network of FIG. 1. The forwarding table on the data plane is used for switching bidirectional traffic. The forwarding table on the control plane is used for controlling the setup of connections and the direction of connection-oriented packets through the node. FIG. 2 shows a logical view of the forwarding tables 210, 220, 250, and 260 for the LSPs along with the state blocks that manage them. These tables are an over-simplification intended merely as an aid to discussing the graceful restart implementation. In FIG. 2, upRsb table 210 is Table (i) for the forward traffic incoming label embedded in RESV message; downRsb table 220 is Table (ii) for the forward traffic outgoing label embedded in RESV message; downPsb table 250 is Table (iii) for the reverse traffic incoming label embedded in PATH message; and upPsb table 260 is Table (iv) for the reverse traffic outgoing label embedded in PATH message. The upPsb table 260 (Table (iv) in FIG. 2), downPsb table 250 (Table (iii) in FIG. 2), downRsb table 220 (Table (ii) in FIG. 2), and then upRsb table 210 (Table (i) in FIG. 2) are downloaded in that order for a regular LSP setup. The forward traffic incoming label table (upRsb table) 210 contains the forward traffic inLabel entry 212 (e.g., ft.inLabel.x, ft.inLabel.y, etc.), forward traffic out interface entry 214 (e.g., ft.outlnterface.x, ft.outlnterface.y, etc.), and forward traffic pointer entry 216 (e.g., ft.Pointer.x, ft.Pointer.y, etc.). The forward traffic outgoing label table (downRsb table) 220 contains the forward traffic outLabel entry 225 (e.g., ft.outLabel.x, ft.outLabel.y, etc.). The forward traffic pointer entry points to the forward traffic out interface entry in the upRsb table; the forward traffic inLabel entry in the upRsb table; and the forward traffic outLabel entry in the downRsb table. The reverse traffic incoming label table (downPsb table) 250 contains the reverse traffic inLabel entry 252 (e.g., rt.inLabel.x, rt.inLabel.y, etc.), reverse traffic out interface entry 254 (e.g., rt.outInterface.x, rft.outInterface.y, etc.), and reverse traffic pointer entry 256 (e.g., rt.Pointer.x, rt.Pointer.y, etc.). The reverse traffic outgoing label table (upPsb table) 260 contains the reverse traffic outLabel 265 (e.g., rt.outLabel.x, rt.outLabel.y, etc.). The reverse traffic pointer entry points to the reverse traffic out interface entry in the downPsb table; the reverse traffic inLabel entry in the downPsb table; and the reverse traffic outLabel entry in the upPsb table. These tables are searched by the node processor (NP) (not shown) for matching the labels received in the PATH and RESV messages to the entries of the tables for binding the control plane to the data plane. In today's routing node, the tables are stored on both the data plane and the control plane as discussed further in the following routing node architecture.

FIG. 3 shows a prior art node 300 having a control plane 310 and a plurality of ingress card 325 and egress card 345 data planes 320 and 340. The control plane 310 having a MPLS control plane 315. The forwarding table 3150 on the MPLS control plane 315 stores the LSP states' tables, (that is, upRsb table 3151, downRsb table 3152, upPsb table 3153, and downPsb table 3154, as discussed in FIG. 2 above). The ingress card data plane 320 stores the forwarding table 3250 for said LSP states' tables, (that is, upRsb table 3251, downRsb table 3252, upPsb table 3253, and downPsb table 3254, as discussed in FIG. 2 above). The egress card data plane 340 stores the forwarding table 3450 for said LSP states' tables, (that is, upRsb table 3451, downRsb table 3452, upPsb table 3453, and downPsb table 3454, as discussed in FIG. 2 above). The MPLS control plane 315 forwarding table 3150 updates the ingress card data plane 320 forwarding table 3250 and egress card data plane 340 forwarding table 3450. In this architecture the MPLS control plane 310 is centralized for ingress and egress cards. The centralized MPLS control plane 310 and ingress and egress data planes 320 and 340 are managed separately and either data or control processor failure will not affect the entire node's operations. The ingress and egress data plane 320 and 340 uses the LSPs states' tables for data and user traffic routing in the network. The control plane 310 uses the LSPs states' tables for setting up the connections and the direction of connection-oriented packets through the network. For various reasons, such as software upgrade or control software crash, the centralized MPLS control plane 310 needs to be restarted more frequently than the data planes 320 and 340. Graceful restart at centralized MPLS control plane 310, recovers the control information on the "down" nodes without disturbing data traffic. In this architecture the forwarding table 3150 for the LSPs states are centralized for all cards and, hence, restarting the centralized MPLS control plane 310 and 315 effects the entire node's operations.

Prior art entitled "Internet draft draft-ietf-mpls-generalized-rsvp-te-09.txt, Generalized MPLS (GMPLS) signalling—RSVP-TE Extensions" by Internet Engineering Task Force (IETF) (April 2002) teaches a centralized RSVP-TE based GMPLS implementation where the LSPs states are stored on the node processor (NP) for the control plane and are centralized for all cards. The routing node architecture is as discussed in FIG. 3 above. In accordance with the prior art, for LSPs passing through a restarting node, both the upstream and downstream neighbours for all cards on the node will be affected. Upstream neighbours would not send PATH messages and disable RESV timeout while the downstream neighbours disable PATH timeout and sending of RESV refresh, (that is, both upstream and downstream neighbours are affected and detected the restart because the nodes cannot send or receive refresh packets).

The centralized RSVP-TE based GMPLS solution relies on recreation of RSVP state based on learning from their neighbours. And since all four states (upPsb, downPsb, upRsb and downRsb) were deleted, when a PATH message is received from an upstream node or a RESV message is received from a downstream node, it appears exactly the same as a new LSP creation for that node and is passed to the corresponding card on the node.

The prior art teaches a recently standardized GMPLS object that is called SUGGEST_LABEL object. When the restart capability object is sent in RSVP Hello messages to advertise a node's restart capability, then the neighbouring node sends a SUGGEST_LABEL object to the restarting node to recover its forwarding state. This is essentially the old label that the restarting node advertised before the node went down. In centralized RSVP-TE based GMPLS implementation, where all four LSPs states are stored on the node's processor (NP) for the control plane, individual card, ingress or egress, cannot be restarted.

The prior art graceful restart for centralized RSVP-TE based GMPLS implementation incorporates the Hello messages between nodes, and the restart capability object to the Hello message. This solution uses a recently standardized SUGGEST_LABEL object, at least two new timers in RSVP state machines, a new requirement to search NP (node processor) forwarding state to correlate with RSVP-TE control state, new capability to distinguish between control channel failure and genuine restart, a new provision for inter-working with fast reroute mechanism and for support of bi-directional LSP (label switched path), and other new features such as bundle, message identifier, and summary of refresh options. These new requirements for centralized RSVP-TE implementation add complexity to the graceful restart solution.

Further, the prior art introduces three new RSVP messages and objects for centralized RSVP-TE based GMPLS implementation graceful restart solution. The Hello messages are used along with bundle messages, message identifier object, and summary refresh to address RSVP scalability issues. The Hello messages are typically sent every five milliseconds to detect node failures if other such mechanisms are not available. The process consists of a node sending a Hello message and the other node responding with a Hello acknowledgement message. Changed instance values in the Hello message are used to indicate that a restart occurred. The receiver of the Hello message waits a configurable multiple of Hello intervals before assuming communication has been lost with the neighbour node. The Hello message can be included in bundle message though this is not mandatory. Another object, the restart capability object, contains the restart time and recovery time fields. The restart time is the time that the sender of the object specifies to the receiver to wait after detecting failure of RSVP communication with the sender. After this time has expired, the receiver can consider the communication severed. This value is set before any restart occurs. The recovery time value is set after the restart. The LSR or LER that has just restarted informs its neighbour that this is the amount of time it retains the forwarding state that it preserved across the restart. The restarting LSR or LER sets a timer based on recovery time value. Once recovery time expires, it deletes the LSP that doesn't have a label. The LSP states are recreated via SUGGEST_LABEL from the LSR neighbour. When recovery time value is zero, it means that the states are not preserved across the restart. When the recovery time value is set equal to "0xffffffff", it means that the states are preserved across restart and retained till removed by means outside of the mechanisms. When the recovery time value is set to "other", it means that no restart is detected, and LSR is operating normally. The third object is a new SUGGEST_LABEL object, which is used to inform the adjacent restarted node with the label value it provided from the sending node when the LSP was setup. It is a means of recreating the state on the restarting node.

In accordance with the prior art, after the restarted node comes up, if unable to preserve the forwarding state, it sets recovery time to zero. Otherwise it sets the recovery time to a configured value that is transmitted in the restart capability object. If the state is preserved, the restarted node sets the MPLS forwarding state holding timer to a configurable value. All RSVP states must be recreated before timer expiry. On expiry of MPLS forwarding state holding timer, the restated node searches through all forwarding plane entries, i.e., the LSPs states' tables discussed before. For each entry, the node tries to find a state in the control plane matching to RSVP. If no matching entry is found, the node deletes forwarding plane entry. When the node receives a PATH message from its neighbouring upstream node, the node searches the RSVP states in the forwarding table. If the state is found, this appears to be a refresh, and then the node treats normally. If the state is not found, and there is no SUGGEST_LABEL, the node treats as a new LSP setup, and if the state is not found and SUGGEST_LABEL is present, the node searches the forwarding tables to find an entry with matching label to the label that is suggested by the upstream node. If the entry is not found, the node treats it as a new LSP setup. If the entry is found (that is, labels are match), the node creates RSVP state and binds to forwarding plane entry. Here both incoming and outgoing labels (bi-directional) are known and fill the upstream label object with the correct label so as not to cause modification to the downstream node.

The Hello messaging between the nodes enables a node to detect that its neighbour's control plane went down. If the neighbouring node implements graceful restart, this is known from previous presence of restart capability object, then the node waits a minimum time between the restart time and local configurable timer, and then the node tries to re-establish communication with the restarted node. If the neighbour's control plane restarted, the node verifies that the neighbour preserved the state across restart via non-zero recovery time in Hello message. For each LSP where the neighbour is downstream next hop, the node inputs the original label received in label object from the neighbour into SUGGEST_LABEL object of PATH message and sends the message to the neighbour. The node holds on sending RESV messages to the neighbour until it receives the PATH message from the restarted node. If the control channel with the neighbour was lost, and the recovery time from the neighbour is non-zero, then the node treats it as communication channel restart and not as a node restart. On communication channel restart, the node sends RSVP summary refresh to the neighbour with a list of all message identifiers for all acknowledge messages.

FIG. 4 (prior art) illustrates a packet that walkthrough a portion of a network 400 for an LSP that is set up and passes through a number of LSR nodes, Node A 402, Node B 404, and Node C 406, for centralized RSVP-TE based GMPLS implementation. The node architecture is as shown in FIG. 3 where the four LSPs states' tables (upRsb, downRsb, downPsb, and upPsb tables) are centralized for all cards and hence, the restart is only performed on the node. The forward direction of traffic 405 is from Node A 402 to Node C 406, and the reverse traffic direction 495 is from node C 406 to node A 402. Node B 420 is restarted. Node A 410 and Node C 430 recognize that Node B 420 is restarted via the Hello messaging 413 and 419 between nodes, and they cancel the refresh mechanism. After a designated time, Node A 410 recognizes that Node B 420 is alive again and sends PATH message 412 to Node B 420 with the same upstream label as before but with the new SUGGEST_LABEL that is same as the label object previously sent from Node B 420 to Node A 410 before the restart. Node B 420 recreates reverse traffic outLabel entry for upPsb table and binds reverse traffic outLabel entry to upPsb table 425. To do the binding, Node B 420 searches upPsb table 425 for a label that matches the upstream lable just received. Node B 420 sends PATH message 414 to downside where reverse traffic inLabel entry for downPsb table is created. Node B searches the downPsb table 426 to find the pointer that matches the reverse traffic outLabel entry in the downPsb table that was found by searching upPsb table 425. From the entry found in the previous step, Node B 420 knows reverse traffic inLabel entry for the downPsb table for reverse direction and updates its label manager accordingly. Node B 420 then fills the PATH message 414 upstream label with this value, and sends the PATH message 414 to Node C 430. Node C 430 receives the PATH message 414 and generates RESV message 418 to Node B 420 soon thereafter. Node B 420 recreates its forward traffic outLabel entry for the downRsb table by searching the downRsb table 427 and binds the forward traffic outLabel entry to downRsb table 427. Node B 420 finds the correct entry in downRsb table 427 by searching the table for the contents of the label object sent by Node C 430. From the Node B 420 perspective, this is the outgoing label for the forward direction traffic. Node B 420 sends the RESV message 416 to the upside where forward traffic inLabel entry for the upRsb table is now created. The forward traffic inLabel entry finds its corresponding entry in upRsb table 428 by matching the SUGGEST_LABEL value received by the reverse traffic outLabel entry in upPsb table 415 from Node A 410 with the forward traffic inLabel entry in the upRsb table 428. The forward traffic inLabel entry in the upRsb table can also find its corresponding entry in the upRsb table 428 by searching the table for the forward traffic pointer entry that matches the forward traffic outLabel entry from downRsb table 427 as passed in the RESV message 418 from forward traffic outLabel entry in the downRsb table. Node B 420 now knows the forward traffic inLabel entry for upRsb table 428 and updates its label manager accordingly. Node B 420 sends the RESV message 416 to Node A 410 with its label object having the same value the SUGGEST_LABEL from Node A 410 contained that looks like regular RESV message 416 from Node A 410 perspective.

Unfortunately, the prior art providing centralized RSVP-TE based GMPLS implementation of hitless restart doesn't allow for an individual card on a node to restart, and therefore, the node restart causes loss of data/user traffic. Introducing a new object (such as, SUGGEST_LABEL object) is strongly resisted by service providers due to the inherent risk of software defects, network instability, and management complexity. Further, the SUGGEST_LABEL object is part of GMPLS (generalized multi-protocol label switching) stack and it is not suitable for use with TMPLS (traditional multi-protocol label switching). This requires customers wishing to incorporate graceful restart in their network to implement the GMPLS stack.

Prior art on protection switching in optical telecommunication network provides another solution for hitless restart, which fully protects all connections within the node at the card level. The 1+1 hitless protection switching provides one protection line card to act as a backup for one working line card, and should the working line card experience a failure, the protection line card automatically takes over and restores data flow to the network. Protection switching uses overhead bytes to identify and trigger protection switchovers. In a 1+1 hitless protection switching, each active line card has a backup (or protection) line card that can be switched into the circuit path while the primary line card is isolated in case the primary board fails. This enables individual card switchover and is accomplished by having a supervisory card that constantly monitors each card on the node and issues a switching command when necessary. Traditionally, switching has been implemented with mechanical relays. From an architecture standpoint, the relay switching solution is easy to design, but comes with inherent drawbacks. The idea is that identical signalling streams are transmitted out over two physical ports. The two receivers on the far side listen only on the working port, known as the primary port. When certain conditions are detected, such as loss of frame, loss of signal, and signal degradation, the receiver simply begins listening on the protection (or backup) port. When transmitting data, both the working port and the protection port send duplicate frames. The transmitting side makes no adjustments or configuration changes during or after protection switching failover.

Thus, the prior art on hitless protection switching for optical telecommunication networks provides graceful restart. However, it requires redundancy in hardware and software resources. These resources are implemented in a one-to-one and one-to-many backup. The 1+1 hitless protection switching is not a centralized implementation of graceful restart, but rather distributed over the line cards, which enable individual card switchover to backup line card with no impact on the entire node's operations. Therefore, for hitless protection switching, redundant hardware and software resources are required for implementing protection switchovers, which results in increased capital and operational costs.

Accordingly, there is a need for the development of improved routing node architecture and methods for hitless graceful restart for an RSVP-TE (resource reservation protocol-traffic engineering) based MPLS (multi-protocol label switching) that would overcome the shortcomings and limitations of the prior art.

SUMMARY OF THE INVENTION

It is an object of the present invention to provide a new system architecture and methods for hitless graceful restart for distributed RSVP-TE (resource reservation protocol-traffic engineering) in a MPLS (multi-protocol label switching) telecommunications networks.

The invention, therefore, according to one aspect provides a system for distributed RSVP-TE (resource reservation protocol-traffic engineering) hitless graceful restart for a MPLS (multi-protocol label switching) network comprising: a plurality of ingress and egress cards, each card having an MPLS control plane forwarding table for reverse and forward traffic outgoing and incoming labels for LSPs (Label Switched Paths) in the MPLS network; a plurality of ingress and egress card data planes, each card data plane having said forwarding table stored thereon; and a means for providing messaging between the ingress card MPLS control plane, ingress card data plane, egress card MPLS control plane, and egress card data plane.

The forwarding table on the ingress card MPLS control plane, ingress card data plane, egress card MPLS control plane, and egress card data plane include a reverse traffic outgoing label table (upPsb table) having a reverse traffic outLabel entry for sending the reverse traffic by the system; a reverse traffic incoming label table (downPsb table) having a reverse traffic inLabel entry for receiving the reverse traffic by the system; a forward traffic outgoing label table (downRsb table) having a forward traffic outLabel entry for sending forward traffic by the system; and a forward traffic incoming label table (upRsb table) having a forward traffic inLabel entry for receiving forward traffic by the system. The reverse traffic incoming label table (downPsb table) further comprises a reverse traffic out interface entry for identifying the reverse traffic output interface on the system; and a reverse traffic pointer entry for pointing to the reverse traffic out interface entry in the downPsb table; the reverse traffic inLabel entry in the downPsb table; and the reverse traffic outLabel entry in the upPsb table. The forward traffic incoming label table (upRsb table) further comprises a forward traffic out interface entry for identifying the forward traffic output interface on the system; and a forward traffic pointer entry for pointing to the forward traffic out interface entry in the upRsb table; the forward traffic inLabel entry in the upRsb table; and the forward traffic outLabel entry in the downRsb table.

In accordance with the embodiments of the present invention, the system for distributed RSVP-TE (resource reservation protocol-traffic engineering) hitless graceful restart for a MPLS (multi-protocol label switching) network comprises an ingress card MPLS control plane means for providing messaging between the ingress card MPLS control plane, the ingress card data plane, and the egress card MPLS control plane; and an egress card MPLS control plane means for providing messaging between the egress card MPLS control plane, the egress card data plane, and the ingress card MPLS control plane. The ingress card MPLS control plane means comprises means for providing Hello messages for detecting a restart status of the egress card MPLS control plane. The egress card MPLS control plane means comprises means for providing Hello messages for detecting a restart status of the ingress card MPLS control plane. The ingress card MPLS control plane means comprises means for providing messages for searching, updating, and binding the forwarding tables stored on the ingress card data plane. The ingress card MPLS control plane means further comprises means for providing messages for searching, updating, and binding the forwarding tables stored on the egress card MPLS control plane. The egress card MPLS control plane means comprises means for providing messages for searching, updating, and binding the forwarding tables stored on the egress card data plane. The egress card MPLS control plane means further comprises means for providing messages for searching, updating, and binding the forwarding tables stored on the ingress card MPLS control plane.

Another aspect of the present invention provides a MPLS network having a plurality of nodes, each node comprising the system for distributed RSVP-TE hitless graceful restart. The plurality of nodes comprises an ingress edge node, an egress edge node, and a core node interconnected with communications links, wherein each node further comprises means for providing communications between the nodes, wherein the communications between the nodes comprises means for providing communications between the corresponding systems on the nodes, wherein the means for providing communications between the systems on the nodes comprises means for providing communications between the corresponding ingress card MPLS control plane and egress card MPLS control plane on the nodes. The MPLS network having a plurality of nodes, wherein the plurality of nodes comprising an ingress edge node, an egress edge node, and a core node, each node having means for providing communications between the nodes. The means for providing communications between the nodes comprises a means for generating a PATH message having the reverse traffic outLabel entry for the upPsb table; a means for generating a PATH message having the reverse traffic inLabel entry for the downPsb table; a means for generating a RESV message having the forward traffic outLabel entry for the downRsb table; and a means for generating a RESV message having the forward traffic inLabel entry for the upRsb table. The means for providing the communications between the nodes comprises means for exchanging of the MPLS Hello messages, wherein the means for exchanging the MPLS Hello messages comprises means for detecting a restart status of each node in the network.

Another aspect of the present invention provides a method for providing distributed RSVP-TE (resource reservation protocol-traffic engineering) hitless graceful restart in the MPLS network, the restart being provided for one of the ingress card MPLS control plane on a node and the egress card MPLS control plane on a node, the method comprising the steps of detecting a status of the ingress card MPLS control plane and detecting a status of the egress card MPLS control plane. If the status of the ingress card MPLS control plane is "Restart", then recovering the ingress card MPLS control plane including recovering the forwarding table on the ingress card MPLS control plane from the egress card MPLS control plane on the same node; from another card MPLS control plane on a neighbouring upstream core node in the network; from another card MPLS control plane on a neighbouring downstream core node in the network; from another card MPLS control plane on a neighbouring upstream ingress edge node in the network; and from another card MPLS control plane on a neighbouring downstream egress edge node in the network. If the status of the egress card MPLS control plane is "Restart", then recovering the egress card MPLS control plane including recovering the forwarding table on the egress card MPLS control plane from the ingress card MPLS control plane on the same node; from another card MPLS control plane on a neighbouring upstream core node in the network; from another card MPLS control plane on a neighbouring downstream core node in the network; from another card MPLS control plane on a neighbouring upstream ingress edge node in the network; and from another card MPLS control plane on a neighbouring downstream egress edge node in the network.

Furthermore, the method for providing distributed RSVP-TE (resource reservation protocol-traffic engineering) hitless graceful restart in the MPLS network further comprises the steps of if the status of the ingress card MPLS control plane is "Restart", continuing communications between the egress card MPLS control plane on the same node and the neighbouring upstream node and the neighbouring downstream node in the MPLS network; and holding off communications between the neighbouring upstream node, the neighbouring downstream node, and the node including the restarted ingress card MPLS control plane. And if the status of the egress card MPLS control plane is "Restart", continuing communications between the ingress card MPLS control plane on the same node and the neighbouring upstream node and the neighbouring downstream node in the MPLS network; and holding off communications between the neighbouring upstream node, the neighbouring downstream node, and the node including the restarted egress card MPLS control plane.

Moreover, the method for providing distributed RSVP-TE (resource reservation protocol-traffic engineering) hitless graceful restart in the MPLS network further comprises searching, updating, and binding the recovered forwarding table on the ingress card MPLS control plane with the forwarding tables on the egress card MPLS control plane and the ingress card data plane on the node. The method further comprises searching, updating, and binding the recovered forwarding table on the egress card MPLS control plane with the forwarding tables on the ingress card MPLS control plane and the egress card data plane on the node. The step of recovering the forwarding table on one of the ingress card MPLS control plane and egress card MPLS control plane comprises recovering the upPsb, downPsb, downRsb and upRsb tables on the restarted ingress card MPLS control plane and the restarted egress card MPLS control plane. The step of recovering the forwarding table on one of the ingress card MPLS control plane and egress card MPLS control plane comprises exchanging of the Hello messages between the ingress and the egress cards MPLS control planes. The step of recovering the ingress card MPLS control plane comprises recovering the ingress card on a core node in the MPLS network. The step of recovering the ingress card MPLS control plane comprises recovering the ingress card on an ingress edge node in the MPLS network. The step of recovering the ingress card MPLS control plane comprises recovering the ingress card on an egress edge node in the MPLS network. The step of recovering the forwarding table on the egress card MPLS control plane comprises recovering the egress card on a core node in the MPLS network. The step of recovering the forwarding table on the egress card MPLS control plane comprises recovering the egress card on an ingress edge node in the MPLS network. The step of recovering the forwarding table on the egress card MPLS control plane comprises recovering the egress card on an egress edge node in the MPLS network.

Another aspect of the present invention provides a method for providing distributed RSVP-TE (resource reservation protocol-traffic engineering) hitless graceful restart in the MPLS network, wherein the restart being provided for a node having the ingress card and the egress card, the method comprising the steps of detecting a status of the node. If the status of the node is "Restart", then recovering the forwarding table on the node from a neighbouring upstream core node in the network; from a neighbouring downstream core node in the network; from a neighbouring upstream ingress edge node in the network; and from a neighbouring downstream egress edge node in the network. The step of recovering the forwarding table on a core node, an ingress edge node, and an egress edge node comprises recovering the upPsb, downPsb, downRsb and upRsb tables on the restarted core node, the restarted ingress edge node, and the restarted egress edge node.

In accordance with a first embodiment of the present invention, the method for providing distributed RSVP-TE (resource reservation protocol-traffic engineering) hitless graceful restart in the MPLS network for recovering the ingress card on the core node in the MPLS network further comprises the steps of creating the reverse traffic outLabel entry for upPsb table using the reverse traffic outLabel entry received in the PATH message from the neighbouring upstream node, the reverse traffic outLabel entry being created by the ingress card MPLS control plane on the core node; creating the forward traffic inLabel entry for upRsb table using the forward traffic outLabel entry in the downRsb table received from the egress card MPLS control plane on the same core node, the forward traffic inLabel entry being created by ingress card MPLS control plane on the core node; searching the downRsb table for the forward traffic outLabel entry which corresponds to the forward traffic inLabel entry in the upRsb table, the searching being performed by the ingress card MPLS control plane on the core node; updating the forwarding table with the forward traffic inLabel entry in the upRsb table, the updating being performed by the ingress card MPLS control plane on the core node and; binding the forward traffic inLabel entry in the upRsb table to the LSP and the forwarding table with the forwarding tables on the ingress card MPLS control plane and the ingress card data plane, the binding being performed by the ingress card MPLS control plane on the core node.

In accordance with a second embodiment of the present invention, the method for providing distributed RSVP-TE (resource reservation protocol-traffic engineering) hitless graceful restart in the MPLS network for recovering the ingress card on the ingress edge node in the MPLS network further comprises the steps of: creating the entries of the forwarding table, the entries being created by the ingress card MPLS control plane on the ingress edge node; and binding the forwarding table to the forwarding tables of the ingress card MPLS control plane and the ingress card data plane, the binding being performed by the ingress card MPLS control plane on the ingress edge node.

In accordance with a third embodiment of the present invention, the method for providing distributed RSVP-TE (resource reservation protocol-traffic engineering) hitless graceful restart in the MPLS network for recovering the ingress card on the egress edge node in the MPLS network further comprises the steps of creating the reverse traffic outLabel entry for the upPsb table, the reverse traffic outLabel entry being created by the ingress card MPLS control plane on the egress edge node; creating the reverse traffic inLabel entry for the downPsb table for the LSP, the reverse traffic inLabel entry being created by the ingress card MPLS control plane on the egress edge node; creating the forward traffic outLabel entry for the downRsb table and sending said entry to the ingress card MPLS control plane on the same egress node, the forward traffic outLabel entry being created by the egress card MPLS control plane on the egress edge node; creating the forward traffic inLabel entry for the upRsb table, the forward traffic inLabel entry being created by the ingress card MPLS control plane on the egress edge node; searching the upRsb table for the forward traffic pointer in the upRsb table that matches the forward traffic outLabel entry in the downRsb table, as passed in the RESV message received from the egress card MPLS control plane on the same egress edge node, the searching being performed by the ingress card MPLS control plane on the egress edge node; and binding the entries of the forwarding table to the LSP and the forwarding table with the forwarding tables on the ingress card MPLS control plane and ingress card data plane, the binding being performed by the ingress card MPLS control plane on the egress edge node.

In accordance with a forth embodiment of the present invention, the method for providing distributed RSVP-TE (resource reservation protocol-traffic engineering) hitless graceful restart in the MPLS network for recovering the egress card on the core node in the MPLS network further comprising the steps of creating the reverse traffic inLabel entry for the downPsb table for the LSP using the reverse traffic outLabel entry in the upPsb table received in the PATH message from the ingress card MPLS control plane on the same core node, the reverse traffic inLabel entry being created by the egress card MPLS control plane on the core node; searching the downPsb table to find a match for the reverse traffic pointer entry received from the ingress card MPLS control plane on the same core node, the searching being performed by the egress card MPLS control plane on the core node; binding the reverse traffic inLabel entry in the downPsb table to the forwarding tables on the egress card MPLS control plane and the egress card data plane, the binding being performed by the egress card MPLS control plane on the core node; recreating the forward traffic outLabel entry for the downRsb table on receipt of RESV message from the ingress card MPLS control plane on the same core node, the forward traffic outLabel entry being created by the egress card MPLS control plane on the core node; searching the downRsb table using the content of the label object in the RESV message, the searching being performed by the egress card MPLS control plane on the core node; and binding the forward traffic outLabel entry to the downRsb table and the forwarding table to the forwarding tables on the egress card MPLS control plane and the egress card data plane, the binding being performed by the egress card MPLS control plane on the core node.

In accordance with a fifth embodiment of the present invention, the method for providing distributed RSVP-TE (resource reservation protocol-traffic engineering) hitless graceful restart in the MPLS network for recovering the egress card on the ingress edge node in the MPLS network further comprising the steps of creating the reverse traffic outLabel entry for the upPsb table and forwarding the PATH message to the neighbouring downstream node, the reverse traffic outLabel entry being created by the egress card MPLS control plane on the ingress edge node; creating the reverse traffic inLabel entry for the downPsb table, the reverse traffic inLabel entry being created by the egress card MPLS control plane on the ingress edge node; searching the reverse traffic inLabel entry in the downPsb table for reverse traffic incoming packets, the searching being performed by the egress card MPLS control plane on the ingress edge node; binding the reverse traffic inLabel entry in the downPsb table to the forwarding tables on the egress card MPLS control plane and the egress card data plane, the binding being performed by the egress card MPLS control plane on the ingress edge node; creating the forward traffic outLabel entry for the downRsb table for the LSP, the forward traffic outLabel entry being created by the egress card MPLS control plane on the ingress edge node; and binding the forward traffic outLabel entry in the downRsb table with the forwarding tables on the egress card MPLS control plane and the egress card data plane when the corresponding entry in the downRsb table is found, the binding being performed by the egress card MPLS control plane on the ingress edge node.

In accordance with a sixth embodiment of the present invention, the method for providing distributed RSVP-TE (resource reservation protocol-traffic engineering) hitless graceful restart in the MPLS network for recovering the egress card on the egress edge node in the MPLS network further comprising the steps of creating the entries for the forwarding table, the entries being created by the egress card MPLS control plane on the egress edge node; and binding the forwarding table with the forwarding tables on the egress card MPLS control plane and the egress card data plane, the binding being performed by the egress card MPLS control plane on the egress edge node.

In accordance with a seventh embodiment of the present invention, the method for providing distributed RSVP-TE (resource reservation protocol-traffic engineering) hitless graceful restart in the MPLS network for recovering the forwarding table on the core node in the MPLS network comprises the steps of creating the reverse traffic outLabel entry for the upPsb table, the reverse traffic outLabel entry being created by the ingress card MPLS control plane on the core node; binding the entries for the LSP with the forwarding tables on the ingress card MPLS control plane and the ingress card data plane, the binding being performed by the ingress card MPLS control plane on the core node; searching the upPsb table for the label that matches the upstream label received from a neighbouring upstream node in the PATH message, the searching being performed by the ingress card MPLS control plane on the core node; recreating the reverse traffic inLabel entry for the downPsb table, the reverse traffic inLabel entry being created by the ingress card MPLS control plane on the core node; binding the reverse traffic inLabel entry to the downPsb table, the reverse traffic inLabel entry being determined by searching the upPsb table using the reverse traffic pointer entry for the reverse traffic outLabel entry, the binding being performed by the ingress card MPLS control plane on the core node; recreating the forward traffic outLabel entry for the downRsb table, the forward traffic outLabel entry being created by the egress card MPLS control plane on the core node; binding the forward traffic outLabel entry to the forwarding tables on the egress card MPLS control plane and the egress card data plane by searching the downRsb table for a matching entry to the label object just received from a neighbouring downstream core node in the RESV message, the binding being performed by the egress card MPLS control plane on the core node; and binding the upRsb table by searching for the forward traffic inLabel entry by matching the reverse traffic outLabel entry in the upPsb table received in the PATH message from a neighbouring upstream egress card MPLS control plane on a neighbouring upstream core node, the binding being performed by the ingress card MPLS control plane on the core node.

In accordance with a weight embodiment of the present invention, the method for providing distributed RSVP-TE (resource reservation protocol-traffic engineering) hitless graceful restart in the MPLS network for recovering of the forwarding table on the ingress edge node in the MPLS network further comprising the steps of creating the reverse traffic outLabel entry for the upPsb table and forwarding the PATH message with said entry to the neighbouring downstream node, the reverse traffic outLabel entry being created by the egress card MPLS control plane on the ingress edge node; searching the downPsb table for reverse traffic incoming packets, the searching being performed by the egress card MPLS control plane on the ingress edge node; binding the reverse traffic inLabel entry in the downPsb table to the forwarding tables on the egress card MPLS control plane and the egress card data plane, the binding being performed by the egress card MPLS control plane on the ingress edge node; and binding the forward traffic outLabel entry in the downRsb table with the forwarding tables on the egress card MPLS control plane and the egress card data plane by finding the corresponding entry in the downRsb table that matches the content of the label object in the RESV message received from the neighbouring downstream node, the binding being performed by the egress card MPLS control plane on the ingress edge node.

In accordance with a ninth embodiment of the present invention, the method for providing distributed RSVP-TE (resource reservation protocol-traffic engineering) hitless graceful restart in the MPLS network for recovering the forwarding table on the egress edge node in the MPLS network further comprises the steps of creating the reverse traffic outLabel entry for the upPsb table, the reverse traffic outLabel entry being created by the ingress card MPLS control plane on the egress edge node; binding the reverse traffic outLabel entry to the upPsb table, the binding being performed by the ingress card MPLS control plane on the egress edge node; searching the upPsb table for reverse traffic outLabel entry that matches the upstream label just received from the neighbouring upstream node, the searching being performed by the ingress card MPLS control plane on the egress edge node; recreating the reverse traffic inLabel entry for the downPsb table, the reverse traffic inLabel entry being created by the ingress card MPLS control plane on the egress edge node; creating the forward traffic outLabel entry for the downRsb table, the forward traffic outLabel entry being created by the ingress card MPLS control plane on the egress edge node; creating the forward traffic inLabel entry for the upRsb table, the forward traffic inLabel entry being created by the ingress card MPLS control plane on the egress edge node; binding the entries for the LSP to the upRsb table and the forwarding tables on the ingress card MPLS control plane and the ingress card data plane, the binding being performed by the ingress card MPLS control plane on the egress edge node; searching the forwarding table for the forward traffic inLabel entry in the upRsb table received from the neighbouring downstream node by matching the reverse traffic outLabel entry in the upPsb table, the searching being performed by the ingress card MPLS control plane on the egress edge node; and binding the forwarding table with the forwarding tables on the ingress card MPLS control plane and the ingress card data plane, the binding being performed by the ingress card MPLS control plane on the egress edge node.

The embodiments of the present invention provide distributed RSVP-TE hitless graceful restart in the MPLS network that allow each card MPLS control plane to store its own forwarding table for the LSPs, and hence, enable a restart of an individual ingress card MPLS control plane on a node and an individual egress card MPLS control plane on a node without impacting the entire node's operations. The system and methods constructed in accordance with the present invention for distributed RSVP-TE hitless graceful restart in the MPLS network allow restarts of an individual ingress card MPLS control plane on a node, an individual egress card MPLS control plane on a node, and the node itself. The present invention does not require the use of the SUGGEST_LABEL object, which requires usage of a GMPLS stack and, hence, provides values to service providers who are concerned about software defects, network instability, and management complexity. Since the present invention achieves hitless graceful restart without using this SUGGEST_LABEL object, it can be used in both TMPLS and GMPLS telecommunications networks. The solution also does not require any new hardware or software resources.

BRIEF DESCRIPTION OF THE DRAWINGS

The invention is better understood from the following description of a preferred embodiment together with reference to the accompanying drawing, in which.

DESCRIPTION OF THE PREFERRED EMBODIMENTS

Figure 1:
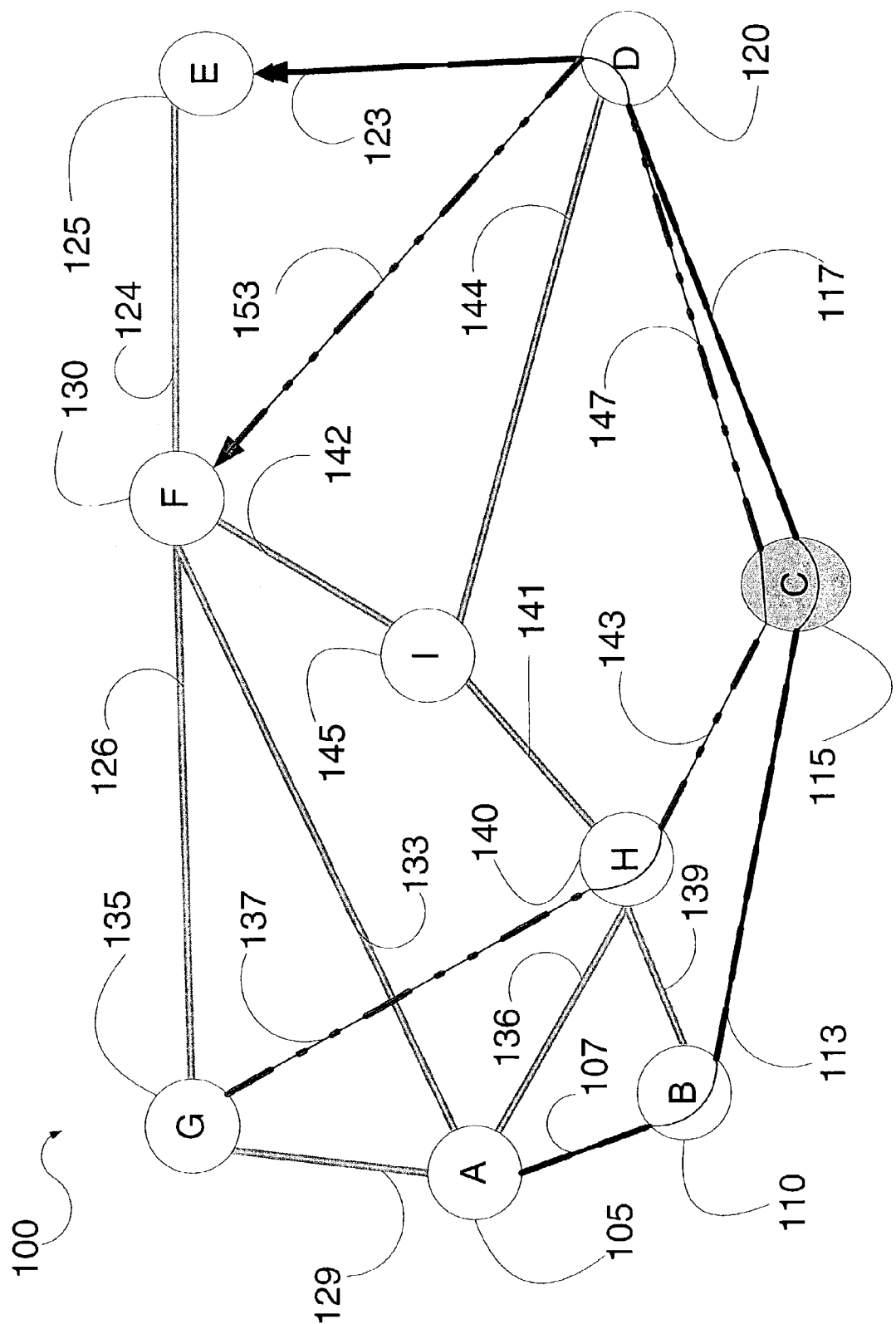
FIG. 1 is a diagram illustrating a typical telecommunications network.
Figure 2:
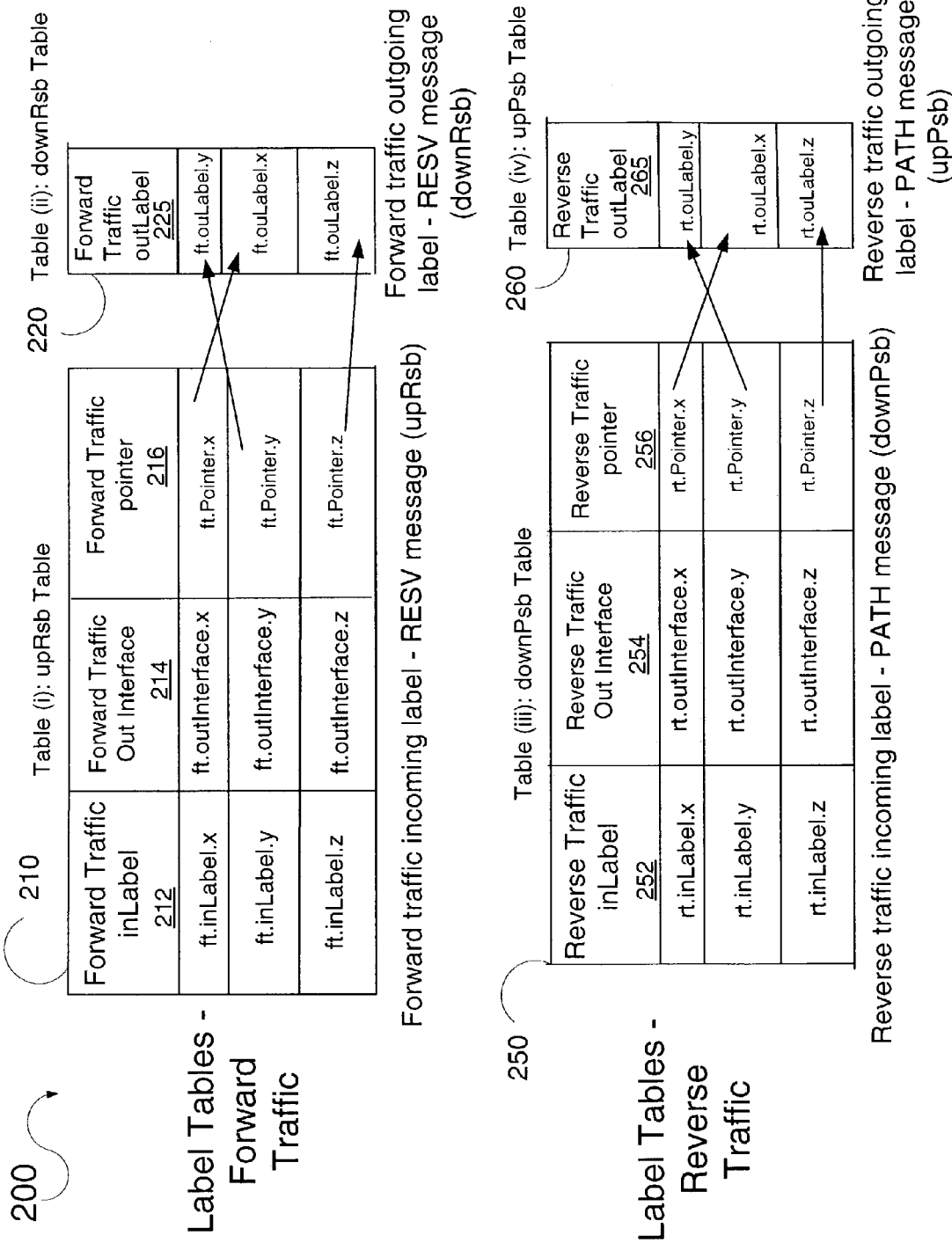
FIG. 2 illustrates the forwarding tables for the LSPs on the nodes in the network of FIG. 1.
Figure 3:
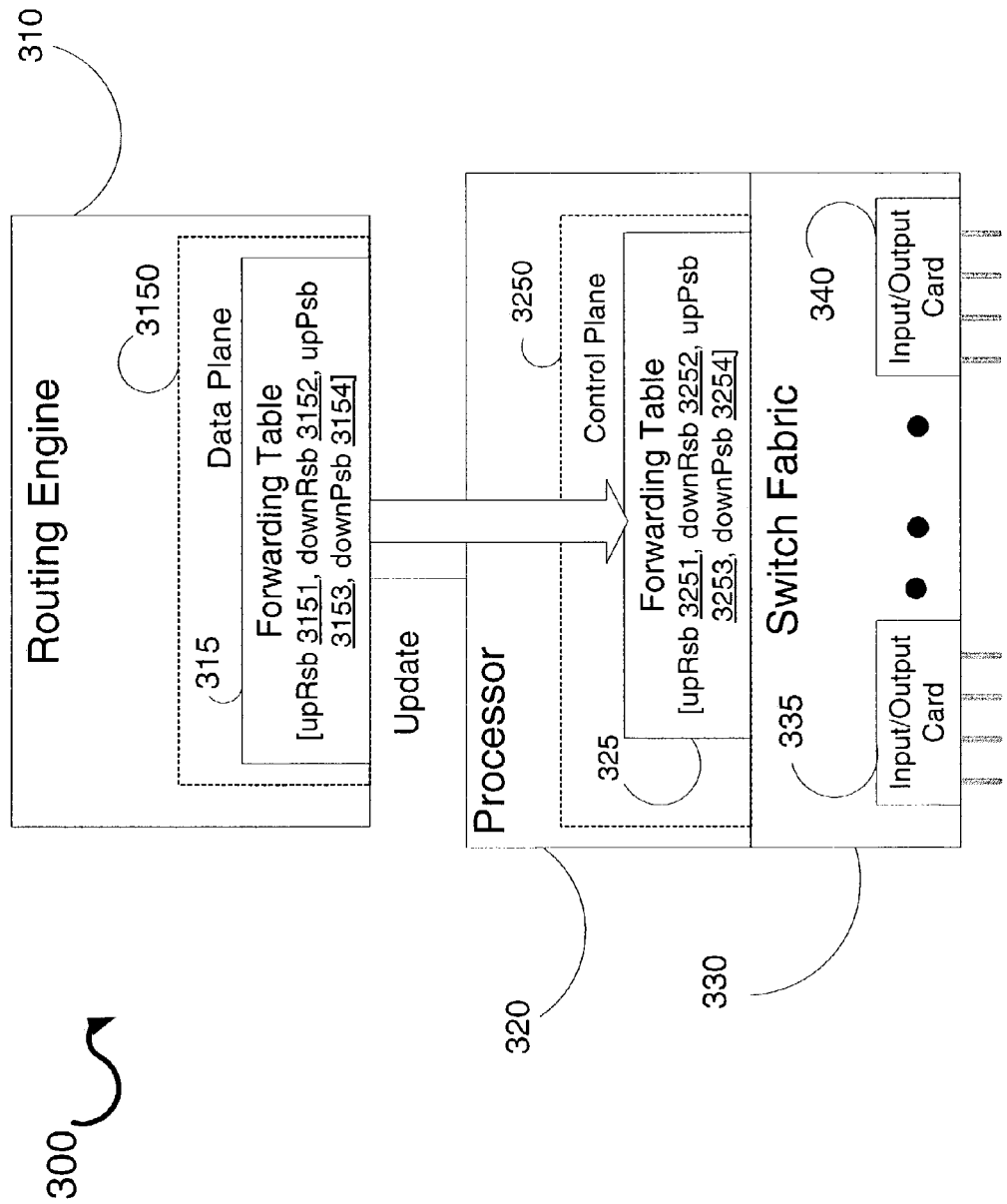
FIG. 3 illustrates a prior art node for the network of FIG. 1.
Figure 4:
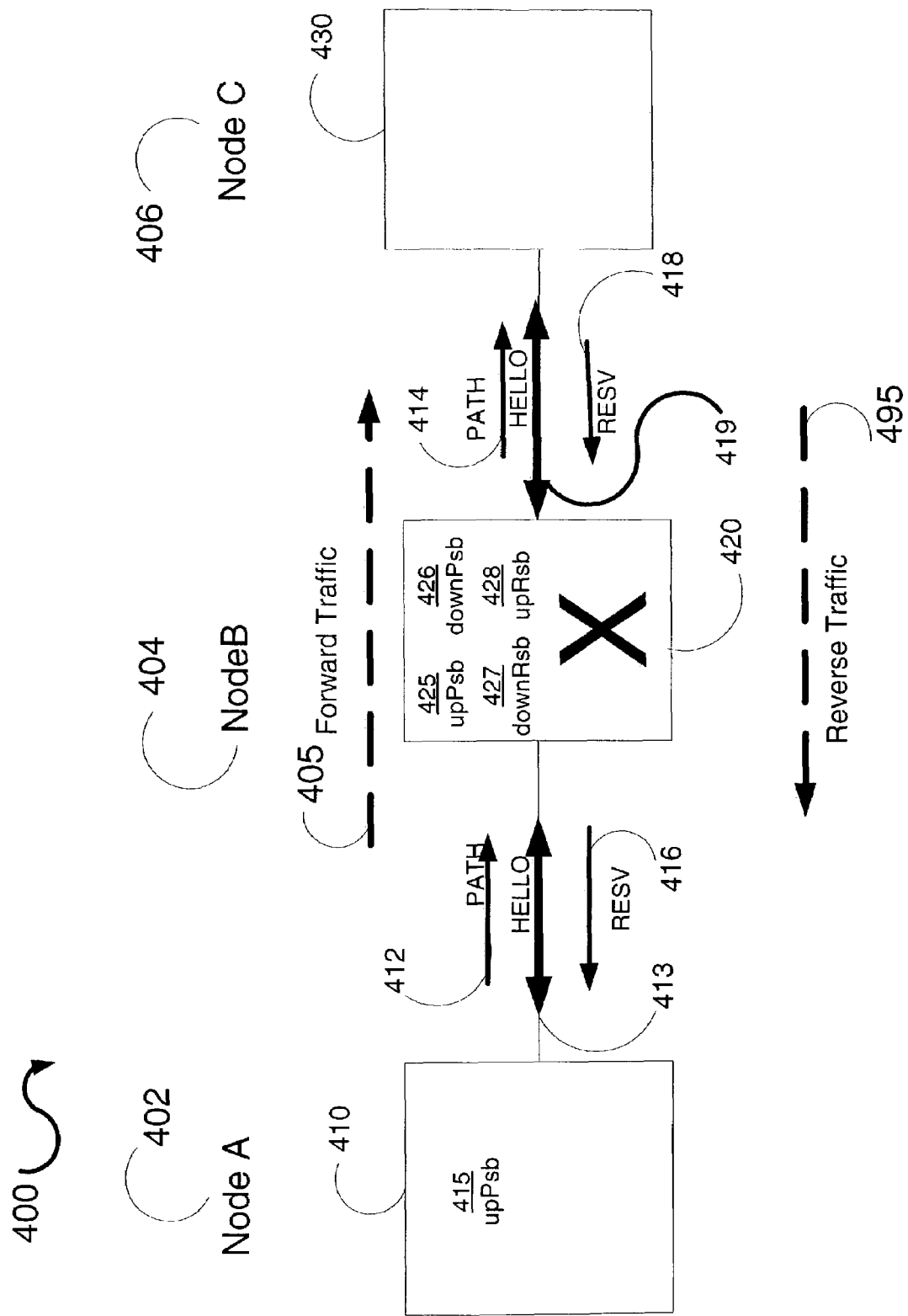
FIG. 4 is a diagram illustrating a prior art packet walkthrough the nodes in the network of FIG. 1.
Figure 5:
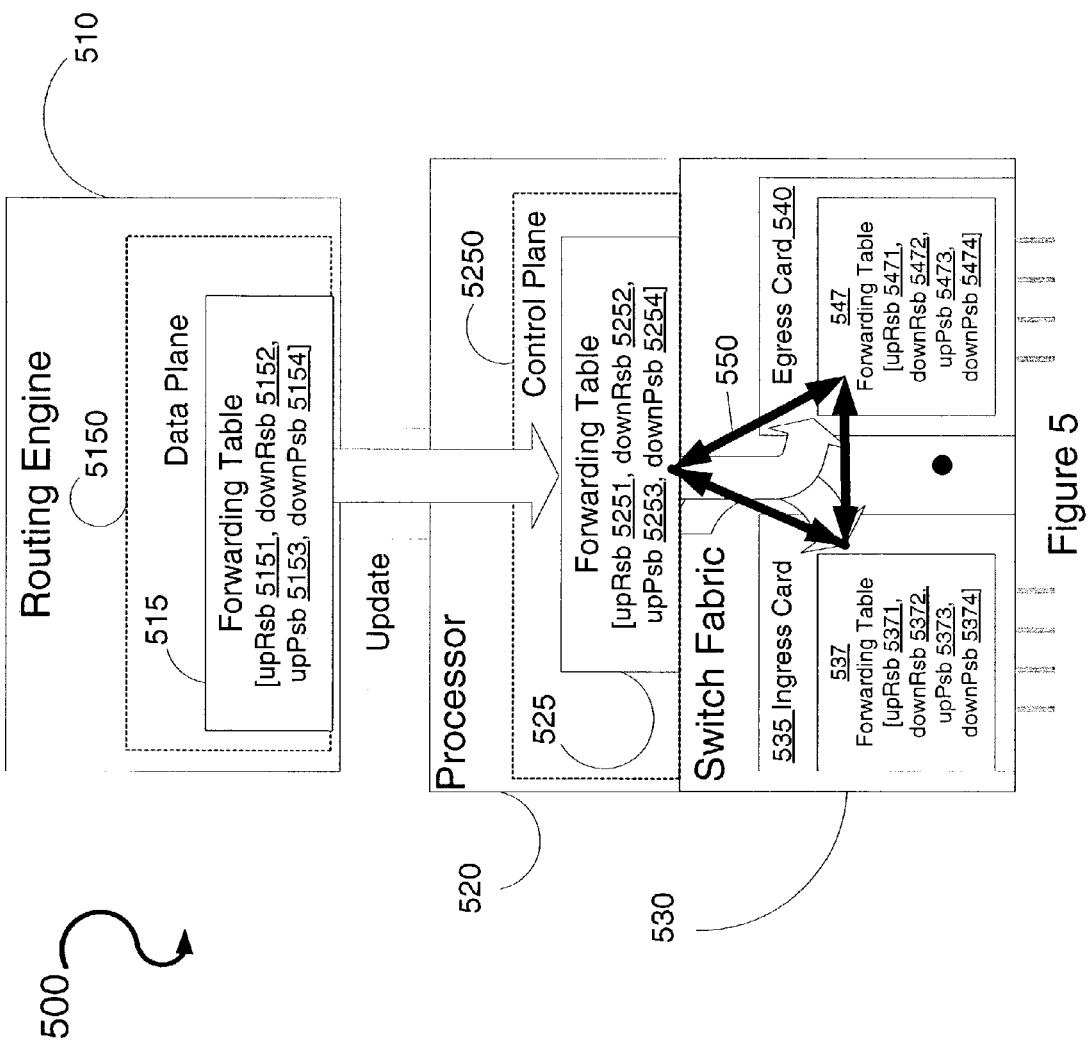
FIG. 5 shows a system for implementing the methods for distributed RSVP-TE hitless graceful restart for a MPLS (multi-protocol label switching) network in accordance with the embodiments of this invention.

FIG. 5 illustrates a system 500 for distributed RSVP-TE hitless graceful restart for a MPLS network comprising a plurality of an ingress card 520 and an egress card 510; a plurality of ingress and egress card MPLS control planes 5250 and 5150, a plurality of ingress and egress cards data planes 535 and 545, means for providing messaging between the ingress and egress cards MPLS control planes 550; means for providing messaging between ingress card 520 MPLS control plane 5250 and ingress card data plane 535; and means for providing messaging between egress card MPLS control plane 5150 and egress card data plane 545. The ingress card 520 comprising an MPLS control plane 5250 having a forwarding table 525 for reverse and forward traffic outgoing and incoming labels for LSPs in the MPLS network; an ingress card data plane 535 having said forwarding table 537; and a means for providing messaging 530 between the ingress card 520 MPLS control plane 5250 and data plane 535. The egress card 510 comprising an MPLS control plane 5150 having a forwarding table 515 for reverse and forward traffic outgoing and incoming labels for LSPs in the MPLS network; an egress card data plane 545 having said forwarding table 547; and a means for providing messaging 540 between the egress card 510 MPLS control plane 5150 and data plane 545.

The ingress card MPLS control plane 5250 forwarding table 525 includes a reverse traffic outgoing label table (upPsb table) 5253; a reverse traffic incoming label table (downPsb table) 5254; a forward traffic outgoing label table (downRsb table) 5252; and a forward traffic incoming label table (upRsb table) 5251. The ingress card data plane 535 forwarding table 537 includes a reverse traffic outgoing label table (upPsb table) 5373; a reverse traffic incoming label table (downPsb table) 5374; a forward traffic outgoing label table (downRsb table) 5372; and a forward traffic incoming label table (upRsb table) 5371.

The egress card MPLS control plane 5150 forwarding table 515 includes a reverse traffic outgoing label table (upPsb table) 5153 having a reverse traffic outLabel entry for sending the reverse traffic by the system; a reverse traffic incoming label table (downPsb table) 5154 having a reverse traffic inLabel entry for receiving the reverse traffic by the system; a forward traffic outgoing label table (downRsb table) 5152 having a forward traffic outLabel entry for sending forward traffic by the system; and a forward traffic incoming label table (upRsb table) 5151 having a forward traffic inLabel entry for receiving forward traffic by the system. The egress card data plane 545 forwarding table 547 includes a reverse traffic outgoing label table (upPsb table) 5473; a reverse traffic incoming label table (downPsb table) 5474; a forward traffic outgoing label table (downRsb table) 5472; and a forward traffic incoming label table (upRsb table) 5471. The data plane 5150 forwarding table 515 provides updates to the control plane 5250 forwarding table 525 that in turns update the ingress card 535 forwarding table 537 and egress card 547 forwarding table 547.

The system for distributed RSVP-TE hitless graceful restart for a MPLS network comprises a means for providing messaging 550 between the ingress card MPLS control plane 5250 and egress card MPLS control plane 5150; a means for providing messaging 530 between the ingress card MPLS control plane 5250 and ingress card data plane 535; and a means for providing messaging 540 between the egress card MPLS control plane 5150 and egress card data plane 545. The MPLS control plane 5250 and 5150 means further comprises means for providing Hello messages for detecting a restart status of the ingress card MPLS control plane 5250 and the egress card MPLS control plane 5150. The ingress card MPLS control plane 5250 means further comprises means for providing Hello messages for detecting a restart status of the egress card MPLS control plane 5150. The egress card MPLS control plane 5150 means further comprises means for providing Hello messages for detecting a restart status of the ingress card MPLS control plane 5250. Furthermore, the ingress card MPLS control plane 5250 means further comprises means for providing messages for searching, updating and binding the forwarding table 525 stored on the ingress card MPLS control plane 5250 and the forwarding table 537 stored on the ingress card data plane 535. The egress card MPLS control plane 5150 means further comprises means for providing messages for searching, updating and binding the forwarding table 515 stored on the ingress card MPLS control plane 5150 and the forwarding table 547 stored on the ingress card data plane 545. The ingress card MPLS control plane 5250 means comprises means for providing messages 550 for searching, updating, and binding the forwarding tables stored on the egress card MPLS control plane 5150. The egress card MPLS control plane 5150 means comprises means for providing messages 550 for searching, updating, and binding the forwarding tables stored on the ingress card MPLS control plane 5250.

The ingress and egress card MPLS control planes 5250 and 5150 and the data planes 535 and 545 in the system 500 of FIG. 5 are managed separately. The MPLS control plane is the software and processing power that controls the setup of connections and the direction of connection-oriented packets, through a switching node and ultimately through the network using the forwarding table (upRsb, downRsb, downPsb, and upPsb tables) for the LSPs. For various reasons, such as software upgrade or control software crash, the MPLS control plane 5250 and 5150 needs to be restarted more frequent than the data plane 535 and 545. Hitless graceful restart at MPLS control plane, recovers the control information on the "down" cards or nodes without disturbing data traffic. In this system the forwarding tables 525 and 515 are stored on the ingress card 520 and egress card 510 MPLS control planes 5250 and 5150, respectively, for the LSPs. Accordingly, the RSVP-TE implementation is distributed on the ingress and egress cards and, hence, an individual card MPLS control plane can be restarted with no impact on the entire node's operation.

In accordance with the present invention, depending on which card MPLS control plane has restarted and whether the card MPLS control plane is on ingress or egress card for an LSP, only one of either the neighbouring upstream or downstream nodes is affected and recognizes that the node has restarted. The other neighbouring nodes continue exchanging refresh packets with the card that has not restarted. Since only one card may have been restarted, typically, when the refreshed PATH or RESV message arrives, it will not be forwarded to the egress or ingress card respectively, the refresh packets are terminated on the card in which they arrive. Therefore, an additional means for messaging 550 in the system 500 is added so that the corresponding card to the restarted card detects when the card is restarted and thus, when it receives the next refreshed PATH or RESV messages, knows that it should forward such packets to the restarted card, if the restart is complete. This initiates RSVP state creation on the restarted card. The new means for messaging 550 enables the restarted card to update the MPLS control plane 5250 forwarding table 525 and binds the control plane 5250 to the data plane 535.

Figure 6:
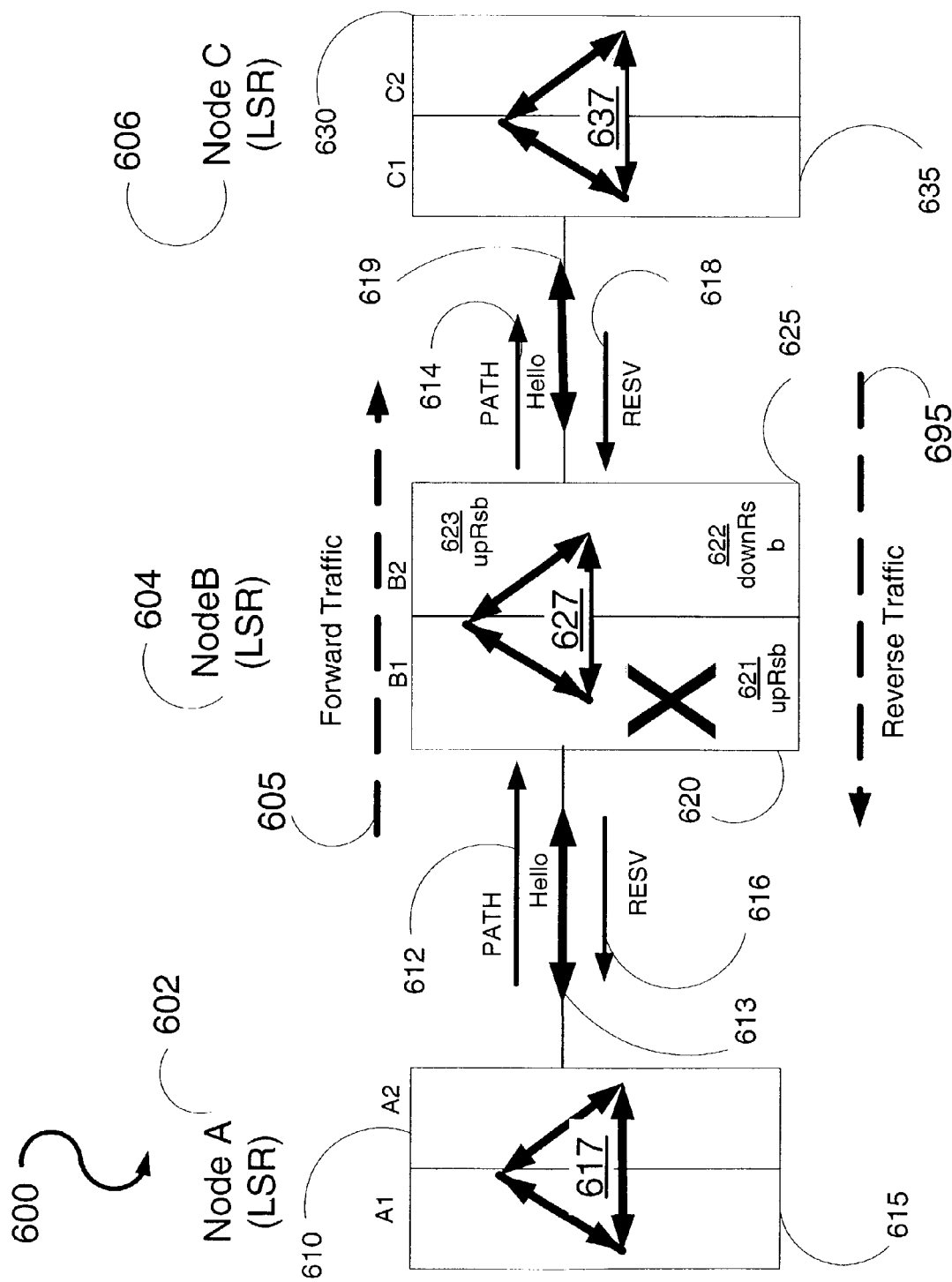
FIG. 6 is a diagram illustrating a packet walkthrough in MPLS network when an ingress card restarts on a core node in accordance with the first embodiment of the invention.

FIG. 6 shows a packet walkthrough 600 for an LSP that is set up and passes through number of LSR nodes Node A 602, Node B 604, and Node C 606. The forward direction of traffic 605 is from node A 602 to node C 606 and the reverse traffic direction 695 is from node C 606 to node A 602. Card $B_1$ 620 MPLS control plane restarts and Cards $B_2$ 625 and $C_1$ keep exchanging refresh PATH messages 614 and RESV messages 618. Card $A_2$ 610 discovers that Card $B_1$ 620 MPLS control plane has gone down, via the Hello messaging 613 between nodes, and holds off sending PATH messages 612. Shortly thereafter, Card $A_2$ 610 discovers that Card $B_1$ 620 MPLS control plane is up—via the Hello messaging 613 between nodes. Card $A_2$ 610 sends a PATH message 612 to Card $B_1$ 620. Card $B_1$ 620 recreates its reverse traffic outLabel entry for this LSP and binds it to the appropriate entry in the data plane upPsb Table 622. The appropriate entry is found by matching the reverse traffic outLabel entry with the value in the UPSTREAM_LABEL object received in the PATH message 612. Card $B_1$ 620 forwards the PATH message 612 to Card $B_2$ 625. If Card $B_2$ 625 receives a RESV Refresh for this LSP from Card $C_1$ 635 and it had previously detected a restart of Card $B_1$ 620 followed by receipt of a PATH message 612 from Card $B_1$ 620 then on arrival of the next RESV refresh message Card $B_2$ 625 sends the RESV refresh message 618 received from Card $C_1$ 635 on to Card $B_1$ 620. Card $B_1$ 620 creates an entry for this LSP in the control plane upRsb table 621 and binds this LSP with the data plane forwarding table which was preserved across the restart. To perform the binding, Card $B_1$ 620 searches the forward traffic upRsb table 621 for the forward traffic pointer which matches the forward traffic outLabel entry in the downRsb table 624 as passed in the RESV message. Card $B_1$ 620 now knows this LSP's forward traffic inLabel as stored in the upRsb 621 table and updates its label manager accordingly to reserve this label value. Card B1 620 sends the RESV message 616 to Card $A_2$ 610 with its LABEL object having the same value as forward traffic inLabel entry in the upRsb table 621.

Figure 7:
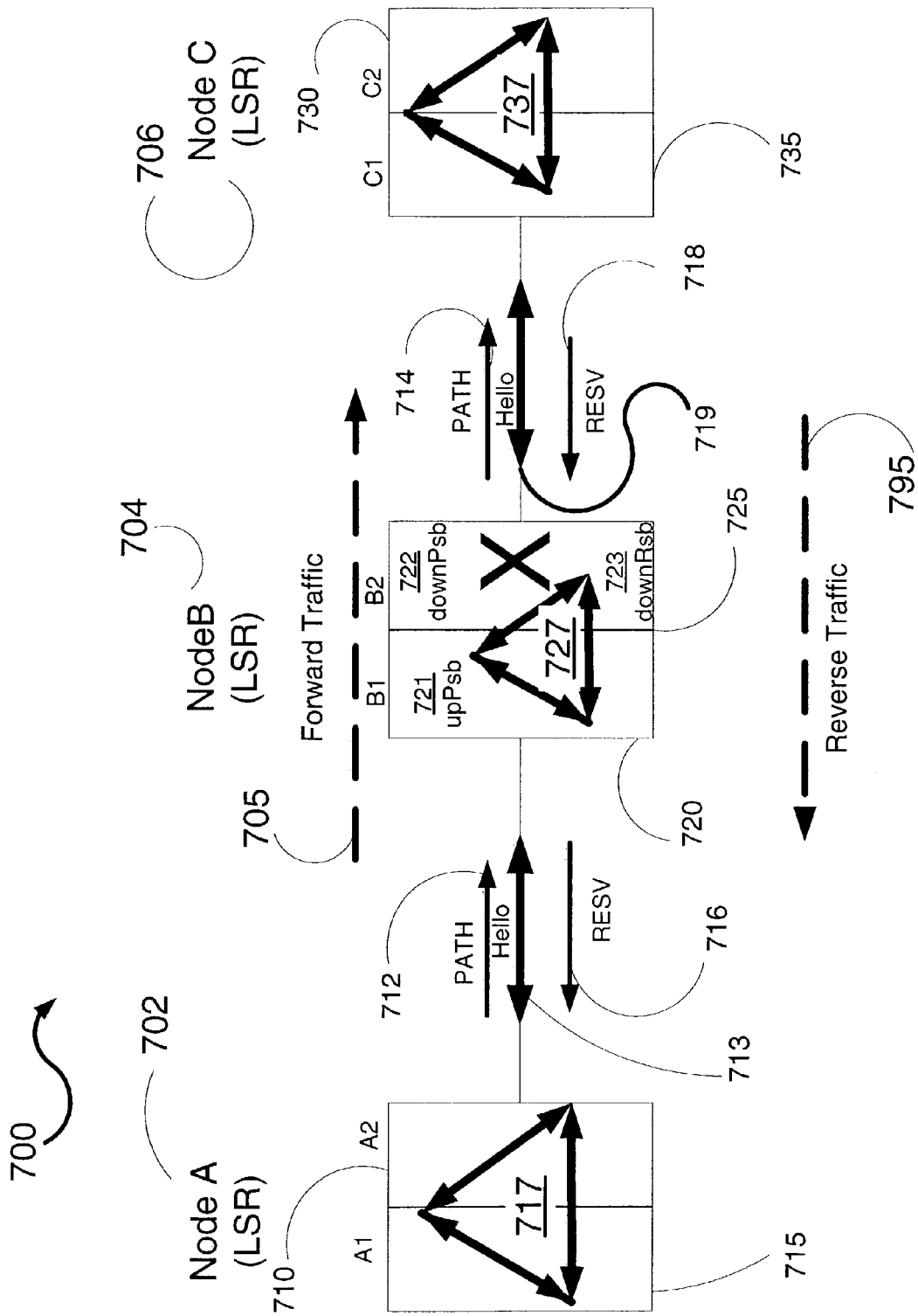
FIG. 7 is a diagram illustrating a packet walkthrough in MPLS network when an egress card restarts on a core node in accordance with another embodiment of the invention.

FIG. 7 shows a packet walkthrough 700 for an LSP that is set up and passes through number of LSR nodes, Node A 702, Node B 704, and Node C 706. The forward direction of traffic 705 is from node A 702 to node C 706 and the reverse traffic direction 795 is from node C 706 to node A 702. Card $B_2$ 725 MPLS control plane is restarted and Card $A_2$ 710 and Card $B_1$ 720 keep exchanging refresh PATH messages 712 and RESV messages 716. Card $C_1$ 735 discovers that Card $B_2$ 725 MPLS control plane has gone down, via the Hello messaging 719 between nodes, holds off sending RESV messages 718, and stops its refresh timers. Card $B_1$ 720 recognizes that Card $B_2$ 725 MPLS control plane went down and restarted, via the Hello messages 727 between cards. Card $B_1$ 720 recognizes that Card $B_2$ 725 MPLS control plane has come up via the Hello messaging 727 between cards. When the next PATH message 712 is received from Card $A_{2\ 710}$ after the restart, Card $B_1$ 720 forwards this PATH message 712 on to Card $B_2$ 725. Card $B_2$ 725 receives the PATH message 712 and creates the reverse traffic inLabel entry for this LSP for downPsb table 722. Card $B_2$ 725 now has to bind its reverse traffic inLabel entry to the data plane entry in the downPsb table 722. From Card $B_1$ 720 PATH message 712, Card $B_2$ 725 received the reverse traffic pointer for reverse traffic outLabel entry in the upPsb table 721. It now searches the downPsb table 722 to find a match for the reverse traffic pointer. From the binding of data plane to control plane, the card knows the reverse traffic inLabel entry in the downPsb table 722. Card $B_2$ 725 updates its label manager to reserve this label and inserts it in the UPSTREAM_LABEL object sent to Card $C_1$ 735. Card $C_1$ 735 receives the PATH message 714 and knows that Card $B_2$ 725 is alive. Card $C_1$ 735 commences sending RESV refreshes messages 718 to Card $B_2$ 725 again. Card $B_2$ 725 recreates the forward traffic outLabel entry for this LSP in the control plane downRsb table 723 on receipt of RESV message 718. Card $B_2$ 725 binds data plane forward traffic outLabel entry to this LSPs control plane downRsb table 723 entry by performing a matching search. The search is successful when the forward traffic outLabel entry in the data plane downRsb table 723 matches the content of the LABEL object in the RESV message 718. Card $B_2$ 725 sends the RESV message 718 to Card $B_1$ 720.

Figure 8:
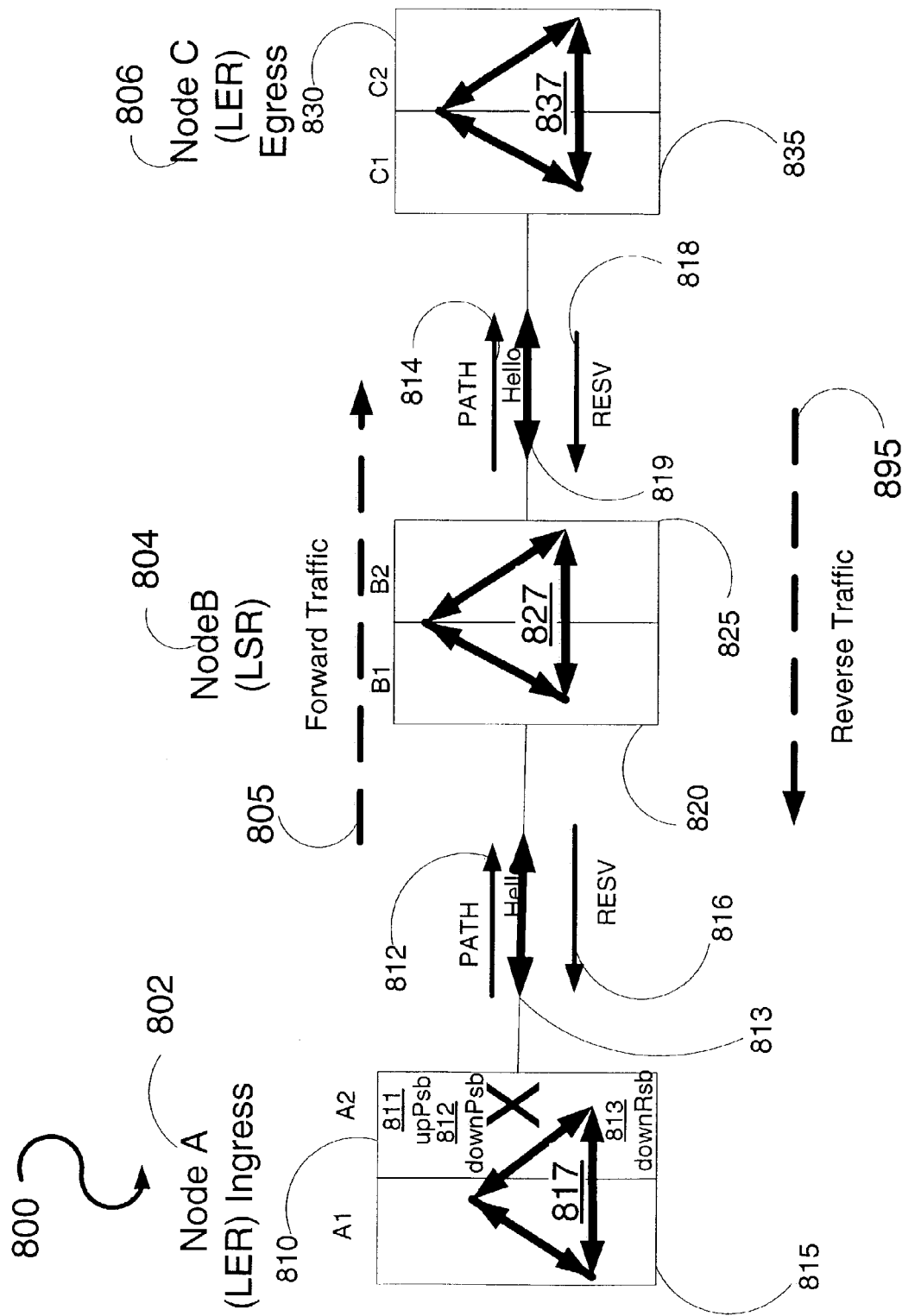
FIG. 8 is a diagram illustrating a packet walkthrough in MPLS network when an egress card restarts on an ingress edge node in accordance with another embodiment of the invention.

FIG. 8 shows a packet walkthrough 800 for an LSP that is set up and passes through number of nodes, Node A 802, Node B 804, and Node C 806. Node A 802 and Node C 806 are ingress and egress LERs (label edge router), respectively, and Node B 804 is an LSR (label switching router). The forward direction of traffic 805 is from Node A 802 to Node C 806 and the reverse traffic direction 895 is from Node C 806 to Node A 802. Card $A_2$ 810 MPLS control plane is restarted. Cards $B_1$ 820 recognizes that Card $A_2$ 810 MPLS control plane has gone down via the Hello messaging 813 between nodes, stops sending RESV refresh messages 816, and also cancels its PATH refresh timeouts. Card $A_1$ 815 detects that Card $A_2$ 810 MPLS control plane has gone down and also detects when it has completed restart, via the Hello messaging 817 between cards. On detecting restart, Card $A_1$ 815 reinitiates a PATH setup of the existing LSPs that exit the node through Card $A_1$ 815. The PATH setup contains the same 5-tuple (LSP Id, Tunnel Id, Extended Tunnel Id, Source IP and Destination IP) that was assigned by when this LSP was first created. Card $A_2$ 810 receives the PATH setup message with a reverse traffic pointer to the table on Card $A_1$ 815 for reverse traffic. A PATH setup is initiated and Card $A_2$ 810 creates an entry for this LSP in the control plane upPsb table 811 and forwards the PATH message 812 to the downside. Card $A_2$ 810 creates an entry for this LSP in the control plane downPsb table 812. It then binds this entry against the corresponding entry in the data plane downPsb table 812. It identifies the correct entry by searching the downPsb reverse traffic pointer for the matching reverse traffic pointer passed by Card $A_1$ 815. On successful match, it binds the control plane to the data plane. Card $A_2$ 810 sends the PATH message 812 to Node B 804 with the correct UPSTREAM_LABEL taken from the reverse traffic inLabel entry in the downPsb table 812. Node B 804 eventually sends RESV message 816 back to Node A 802. Card $A_2$ 810 receives the RESV message 816 and creates the forward traffic outLabel entry in the downRsb table 813 for this LSP. Card $A_2$ 810 binds forward traffic outLabel entry in the downRsb table 813 with the data plane when the corresponding entry in the downRsb table 813 is found. The corresponding entry is found by matching the content of the LABEL object in the RESV message 816 with the forward traffic outLabel entry in the data plane downRsb outLabel 813. Card $A_2$ 810 forwards the RESV message 816 to the upside where the corresponding forward traffic inLabel entry for the upRsb table 814 is created for this LSP. Since there is no corresponding data plane entry for this forward traffic inLabel entry for the control plane, there is no binding or matching search undertaken. Card $A_2$ 810 informs Card $A_1$ 815 of the recreation of state for this LSP and passes it the pointer to the forward traffic outLabel entry in the downRsb table 813.

Figure 9:
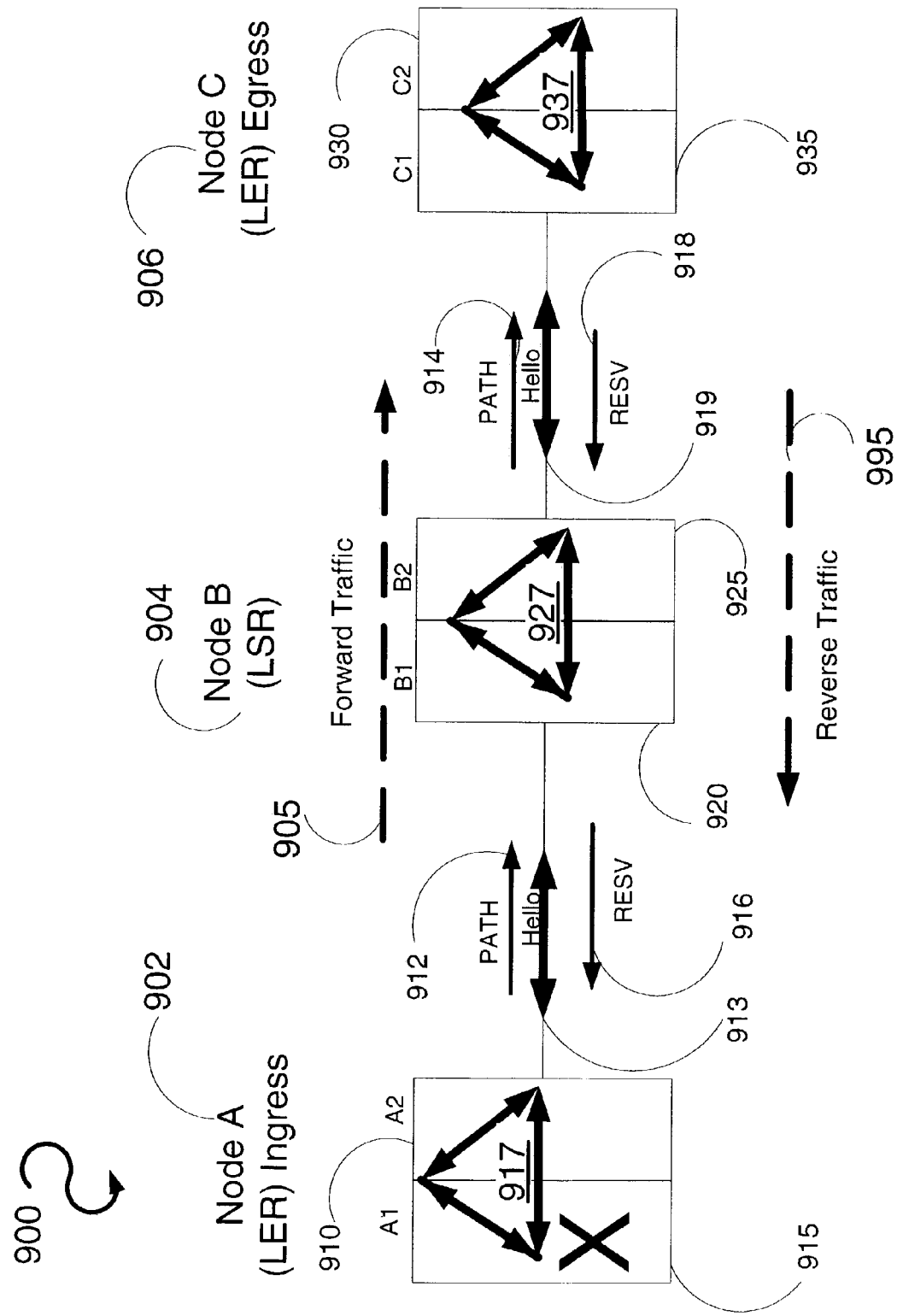
FIG. 9 is a diagram illustrating a packet walkthrough in MPLS network when an ingress card restarts on an ingress edge node in accordance with another embodiment of the invention.

FIG. 9 shows a packet walkthrough 900 for an LSP that is set up and passes through number of nodes, Node A 902, Node B 904, and Node C 906. Node A 902 and node C 906 are ingress and egress LERs (label edge router), respectively and Node B 904 is an LSR (label switching router). The forward direction of traffic 905 is from Node A 902 to Node C 906 and the reverse traffic direction 995 is from Node C 906 to Node A 902. Card $A_1$ 915 MPLS control plane is restarted. Card $A_2$ 910 and Card $B_1$ 920 keep exchanging refresh messages. After Card $A_1$ 915 MPLS control plane comes up using the Hello, update and binding messaging 917 between the cards, Card $A_2$ 910 receives PATH setup request for original LSP from its peer Card $A_1$ 915. This request must give the original LSPs identifiers (LSP Id, Tunnel Id, Extended Tunnel Id, Source IP and Destination IP), so that Card $A_2$ 910 knows that this is not a new LSP request. When Card $A_2$ 910 receives the RESV refresh message 916 from Card $B_1$ 920, it notifies Card $A_1$ 915 via the Hello messaging 917. Card $A_1$ 915 uses the information to recreate its own state as before.

Figure 10:
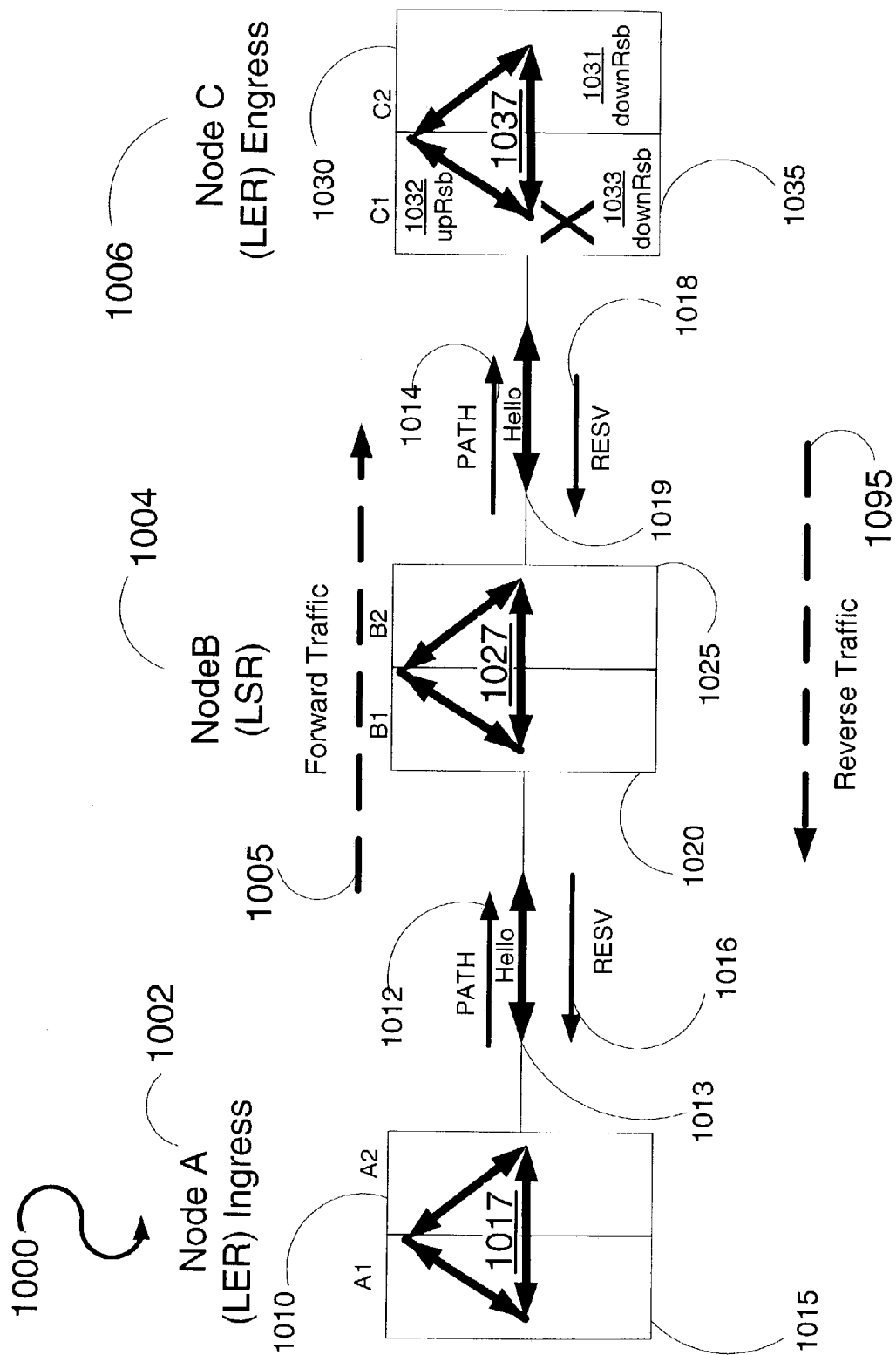
FIG. 10 is a diagram illustrating a packet walkthrough in MPLS network when an ingress card restarts on an egress edge node in accordance with another embodiment of the invention.

FIG. 10 shows a packet walkthrough 1000 for an LSP that is set up and passes through number of nodes, Node A 1002, Node B 1004, and Node C 1006. Node A 1002 and Node C 1006 are ingress and egress LERs (label edge router), respectively, and Node B 1004 is an LSR (label switching router). The forward direction of traffic 1005 is from Node A 1002 to Node C 1006 and the reverse traffic direction 1095 is from Node C 1006 to Node A 1002. Card $C_1$ 1035 MPLS control plane is restarted and Card $B_2$ 1025 recognizes that Card $C_1$ 1035 MPLS control plane has gone down via the Hello messaging 1019 between nodes, stops sending PATH refresh messages 1014, and also cancels its RESV refresh timeouts. Eventually, Card $B_2$ 1025 recognizes that Card $C_1$ 1035 MPLS control plane has come back up via the Hello messaging 1019 between nodes. Card $B_2$ 1025 sends a PATH message 1014 to Card $C_1$ 1035 with the same UPSTREAM_ LABEL as before. Card $C_1$ 1035 creates a Control Plane upPsb entry for this LSP and binds this entry with the reverse traffic outLabel entry in the data plane upPsb table 1032. To perform the binding, Card $C_1$ 1035 searches the reverse traffic outLabel value that matches the value in the recently received PATH message 1014 UPSTREAM_LABEL object. The reverse traffic inLabel entry for the downPsb table 1034 is then created for this LSP in the control plane of Card $C_1$

1035. This entry is not bound to the data plane. Instead the connection manager on Card $C_2$ 1030 is informed of the recovery of this LSP after restart. Card $C_2$ 1030 sends a RESV message to Card $C_1$ 1035 and gives it the forward traffic pointer to the table on Card $C_2$ 1030 for forward going traffic. On receipt of the RESV, Card $C_1$ 1035 then recreates the control plane downRsb table 1031 entry for this LSP. This entry is not bound to a corresponding data plane entry. Card $C_1$ 1035 creates the control plane forward traffic inLabel entry for upRsb table 1033 and binds this LSP with the table in the data plane. Card $C_1$ 1035 searches upRsb table 1033 for the forward traffic pointer in the upRsb table 1033 that matches the forward traffic entry on Card $C_2$ 1030, as passed in the RESV message 1018. Card $C_1$ 1035 now knows the forward traffic inLabel entry for the upRsb table 1033. Card $C_1$ 1035 updates its label manager to reserve this label value. Card $C_1$ 1035 sends the RESV message 1018 to Card $B_2$ 1025 with a LABEL object containing the value of the forward traffic inLabel discovered above.

Figure 11:
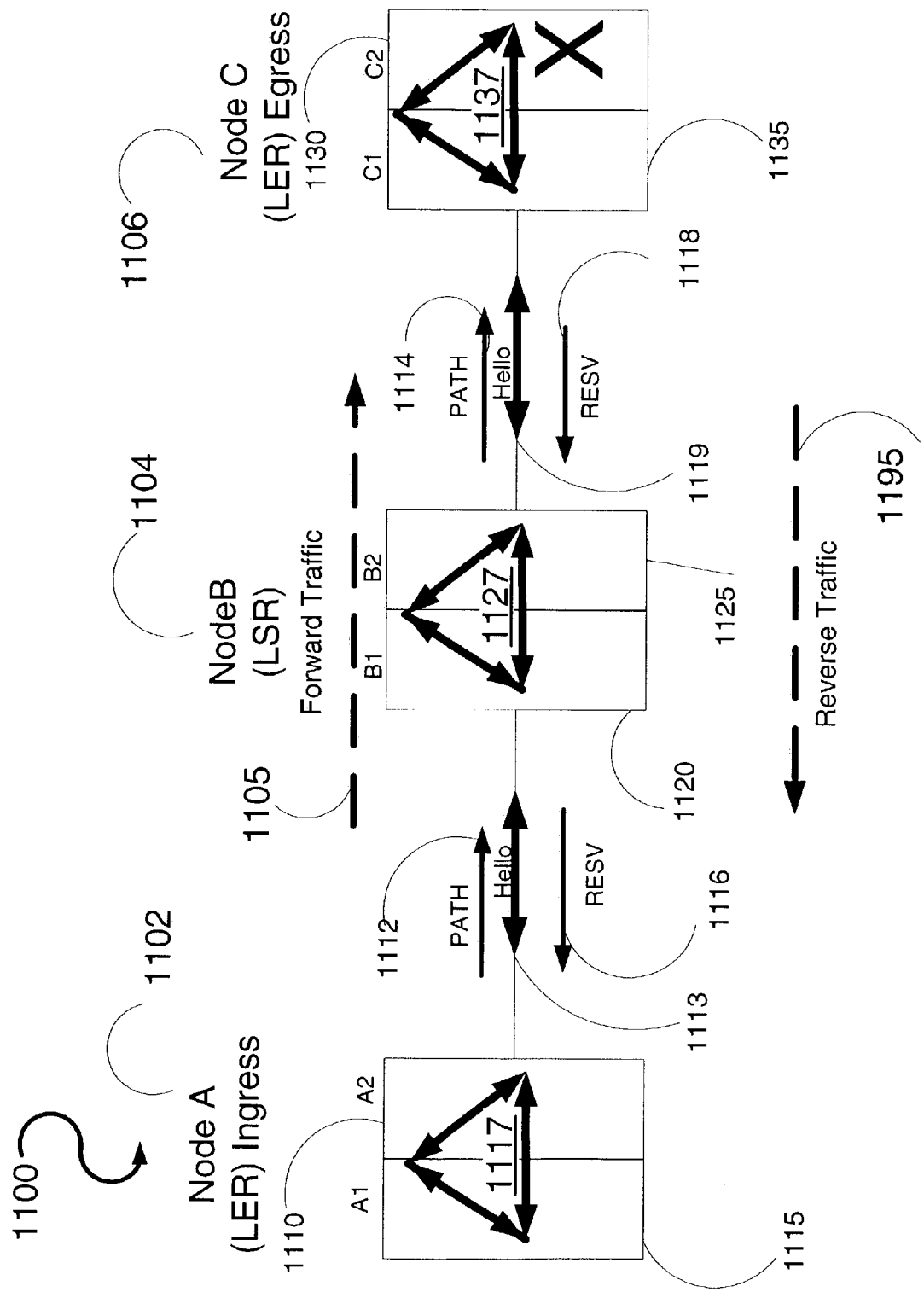
FIG. 11 is a diagram illustrating a packet walkthrough in MPLS network when an egress card restarts on an egress edge node in accordance with another embodiment of the invention.

FIG. 11 shows a packet walkthrough 1100 for an LSP that is set up and passes through number of nodes, Node A 1102, Node B 1104, and Node C 1106. Node A 1102 and Node C 1106 are ingress and egress LERs, respectively, and Node B 1104 is an LSR. The forward direction of traffic 1105 is from Node A 1102 to Node C 1106 and the reverse traffic direction 1195 is from Node C 1106 to Node A 1102. Card $C_2$ 1030 MPLS control plane is restarted. Card $B_2$ 1125 and Card $C_1$ 1135 keep exchanging PATH and RESV refresh messages 1114 and 1118. After Card $C_2$ 1130 MPLS control plane comes up, Card $C_1$ 1135 detects this via the Hello messaging 1137 between cards and initiates operations to recreate state at Card $C_2$ 1130. On receiving the next PATH refresh message 1114 from Card $B_2$ 1125 Card $C_1$ 1135 forwards this PATH message 1114 to Card $C_2$ 1130 along with a reverse traffic pointer entry to the reverse traffic outLabel entry in its upPsb table and the forward traffic pointer for this LSPs entry in its upRsb table. This will allow Card $C_2$ 1130 to successfully recreate relevant entries in its control and data planes for this LSP. Card $C_2$ 1130 will eventually send a message to Card $C_1$ 1135 indicating that state recreation on Card $C_2$ 1130 is now complete.

Figure 12:
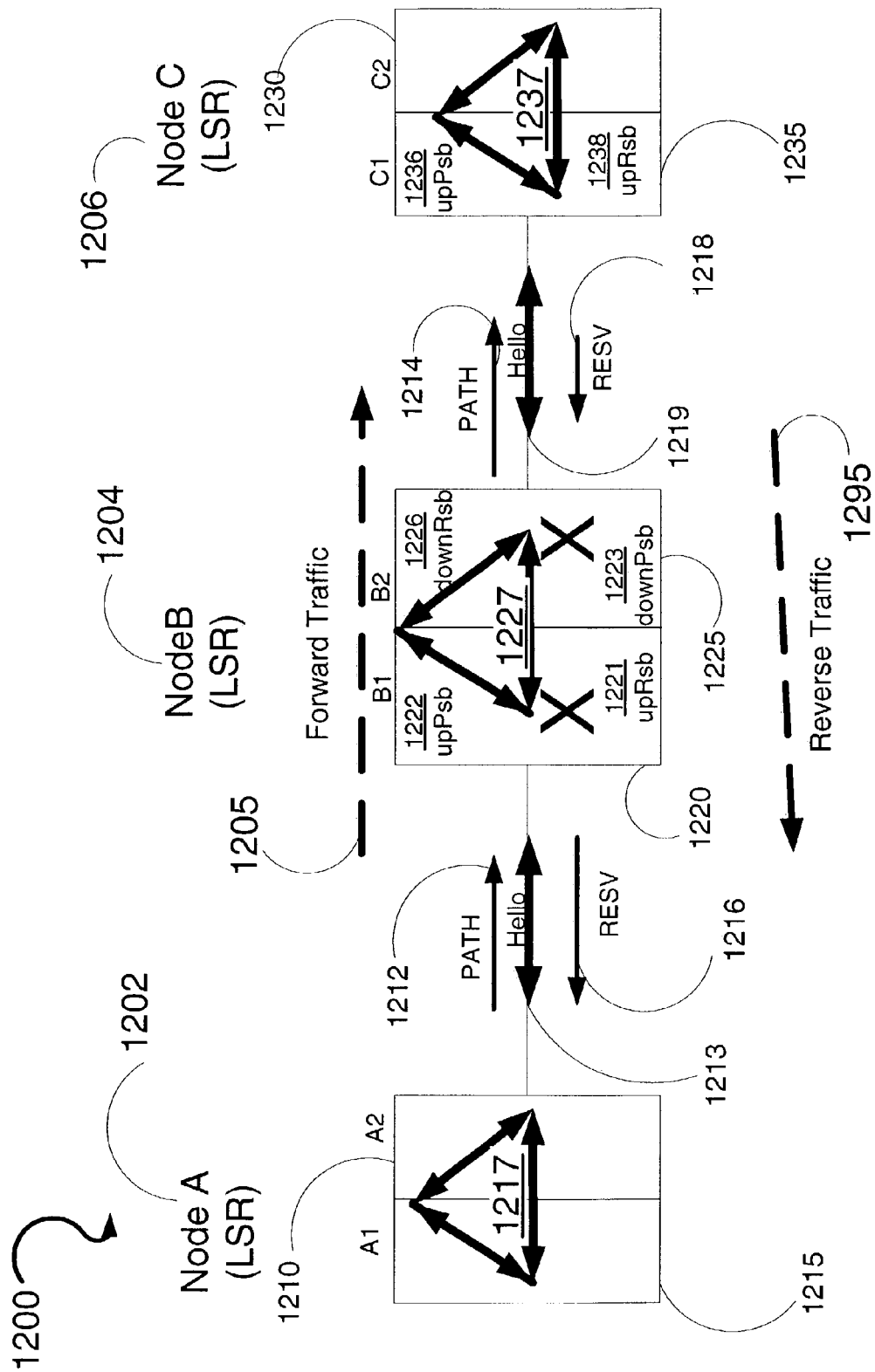
FIG. 12 is a diagram illustrating a packet walkthrough in MPLS network when a core node restarts in accordance with another embodiment of the invention.

FIG. 12 shows a packet walkthrough 1200 for the case of controlled software upgrade that often involves multiple cards restart on a node at the same time instead of sequentially restarting of one card at a time. The packet walkthrough 1200 for an LSP is set up and passes through number of LSR nodes, Node A 1202, Node B 1204, and Node C 1206. The forward direction of traffic 1205 is from Node A 1202 to Node C 1206 and the reverse traffic direction 1295 is from Node C 1206 to Node A 1202. Cards $B_1$ 1220 MPLS control plane and Card $B_2$ 1225 MPLS control plane for a set of LSPs are restarted on Node B 1204. Via Hello messages 1213 and 1219 between nodes, Card $A_2$ 1210 and Card $C_1$ 1235 discover that Card $B_1$ 1220 MPLS control plane and $B_2$ 1225 MPLS control plane have gone down, respectively. They stop generating refresh PATH messages 1212 and 1214 and RESV messages 1216 and 1218, and also turn off their respective RESV and PATH refresh timeout timers. Via Hello messaging 1213 between nodes, Card $A_2$ 1210 discovers that Card $B_1$ 1220 MPLS control plane is now up. Card $A_2$ 1210 sends PATH message 1212 to Card $B_1$ 1220. The message contains UPSTREAM_LABEL. Card $B_1$ 1220 creates the control plane reverse traffic outLabel entry for the upPsb table 1222 and binds this entry with the table in the data plane. The binding is performed by Card $B_1$ 1220 when it searches the data plane upPsb table 1222 for the label that matches the UPSTREAM_LABEL received in the PATH message 1212. Card $B_1$ 1220 forwards the PATH message 1212 to Card $B_2$ 1225 to recreate its control plane reverse traffic inLabel entry for the downPsb table 1223. Card $B_2$ 1225 binds the control plane reverse traffic inLabel entry to the data plane downPsb table 1223 via searching on the reverse traffic pointer for the upPsb table 1222. Card $B_2$ 1225 updates its label manager to reserve the label value found in the reverse traffic inLabel entry for the downPsb table 1223. Card $B_2$ 1225 then fills the UPSTREAM_LABEL with this value and sends the PATH message 1214 to Card $C_1$ 1235. Card $C_1$ 1235 recognizes that Node B 1204 is now up and tells the upRsb table 1238 to start its RESV refresh messaging. Card $C_1$ 1235 sends RESV message 1218 to Card $B_2$ 1225 with the forward traffic inLabel entry for the upRsb table 1238 of Card $C_1$ 1235. Card $B_2$ 1225 recreates its control plane forward traffic outLabel entry for the downRsb table 1226 and binds to the data plane by searching the data plane downRsb table 1226 for a matching entry to the LABEL object just received in the RESV message 1218. The RESV message 1218 is then forwarded to Card $B_1$ 1220. Card $B_1$ 1220 receives the RESV message 1218 and recreates its control plane forward traffic inLabel entry for the upRsb table 1221. Card $B_1$ 1220 binds this entry to the data plane upRsb table 1221 by searching forward traffic pointer entry for the upRsb table 1221 for a match against the forward traffic outLabel pointer for downRsb Table 1226 as passed in the recently received RESV message 1218. When the match and binding are complete, the forward traffic inLabel value for the upRsb table 1221 has now been identified. Card $B_1$ 1220 updates its label manager to reserve this label value. Card B1 1220 sends the RESV message 1216 to Card $A_2$ 1210 with its LABEL object having this reserved label value as the forward traffic inLabel value in the upRsb table 1221.

Figure 13:
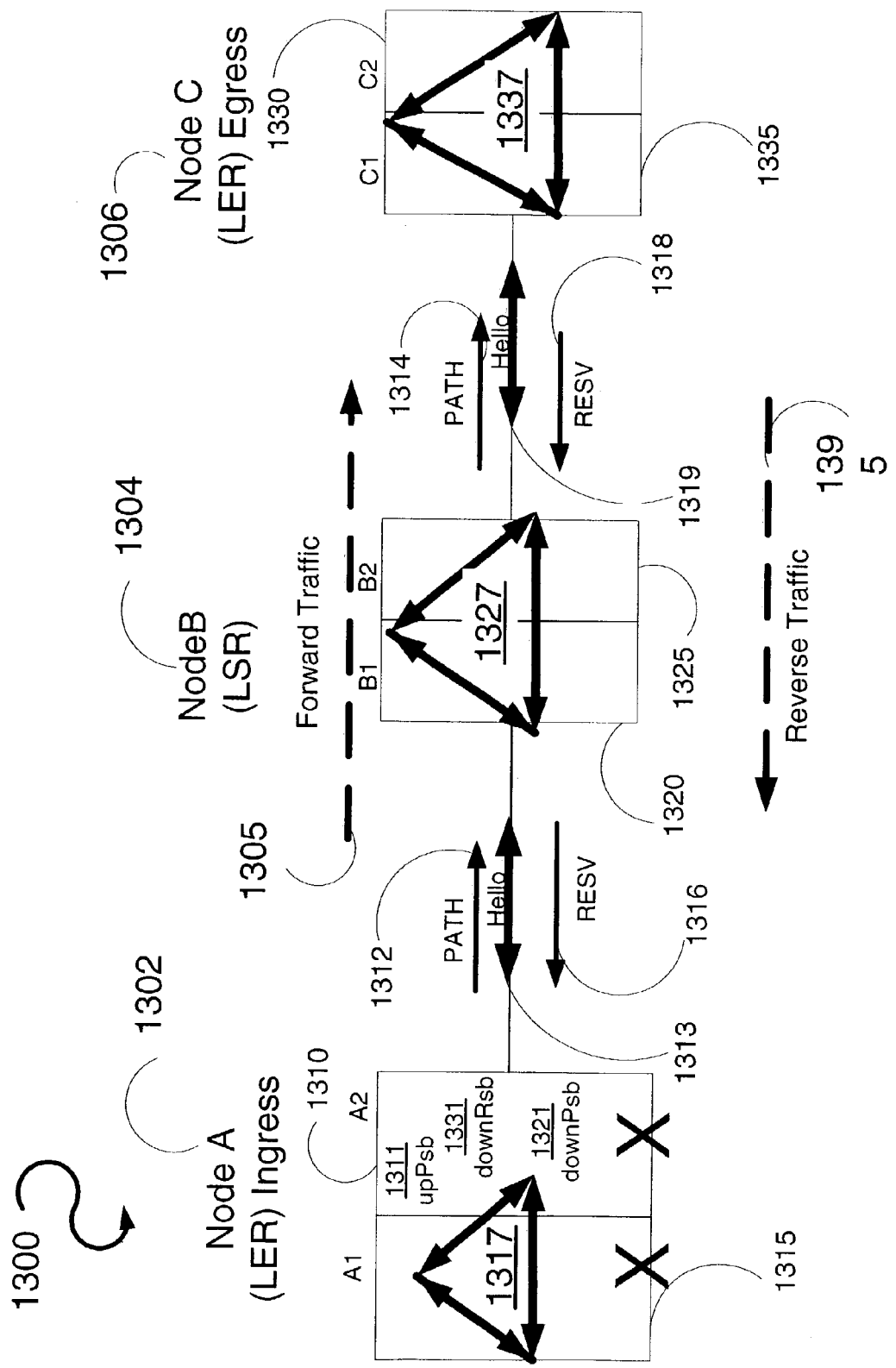
FIG. 13 is a diagram illustrating a packet walkthrough in MPLS network when an ingress edge node restarts in accordance with another embodiment of the invention.

FIG. 13 shows an ingress edge node restarts for a packet walkthrough 1300 for an LSP that is set up and passes through number of nodes, Node A 1302, Node B 1304, and Node C 1306. Node A 1302 and Node C 1306 are ingress and egress LERs (label edge router), respectively, and Node B 1304 is an LSR (label switching router). The forward direction of traffic 1305 is from Node A 1302 to Node C 1306 and the reverse traffic direction 1395 is from Node C 1306 to Node A 1302. Card $A_1$ 1315 MPLS control plane and Card $A_2$ 1310 MPLS control plane are restarted on an LER (label edge router) Node A 1302. Cards $B_1$ 1320 recognizes that Card $A_2$ 1310 MPLS control plane has gone down, via the Hello messaging 1313 between nodes, and stops sending RESV refresh message 1316, and also cancels its PATH refresh timeouts. Card $A_1$ 1315 recreates its LSP state independent of MPLS and also detects that Card $A_2$ 1310 MPLS control plane has come up. On detecting restart, Card $A_1$ 1315 reinitiates a PATH setup of the existing LSPs that exit the node through Card $A_1$ 1315. The PATH setup must contain the same 5-tuple (LSP Id, Tunnel Id, Extended Tunnel Id, Source IP and Destination IP) that was assigned when this LSP was first created. Card $A_2$ 1310 receives the PATH setup message with a reverse traffic pointer to the table on Card $A_1$ 1315 for reverse traffic. A PATH setup is initiated and Card $A_2$ 1310 creates an entry for this LSP in the control plane upPsb table 1311 and forwards the PATH message 1312 to the downside. Card $A_2$ 1310 creates an entry for this LSP in the control plane downPsb table 1321. It then binds this entry against the corresponding entry in the data plane downPsb table 812. It identifies the correct entry by searching the downPsb reverse traffic pointer entry for the matching reverse traffic pointer passed by Card $A_1$ 1315. On successful match, it binds the control plane to the data plane.

Card A₂ 1310 sends the PATH message 1313 to Node B 1304 with the correct UPSTREAM_LABEL taken from the reverse traffic inLabel entry in the downPsb table 1321. Node B 1304 eventually sends RESV message 1316 back to Node A 1302. Card A₂ 1310 receives the RESV message 1316 and creates the forward traffic outLabel entry in the downRsb table 1331 for this LSP. Card A₂ 1310 binds forward traffic outLabel entry in the downRsb table 1331 with the data plane when the corresponding entry in the downRsb table 1331 is found. The corresponding entry is found by matching the content of the LABEL object in the RESV message 1316 with the data plane forward traffic outLabel entry for the downRsb table 1331. Card A₂ 1310 forwards the RESV message 1316 to the upside where the corresponding forward traffic inLabel entry for upRsb table 1341 is created for this LSP. Since there is no corresponding data plane entry for this forward traffic inLabel entry for the control plane, there is no binding or matching search undertaken. Card A₂ 1310 informs Card A₁ 1315 of the recreation of state for this LSP and passes it the pointer to the forward traffic outLabel entry in the downRsb table 1331.

Figure 14:
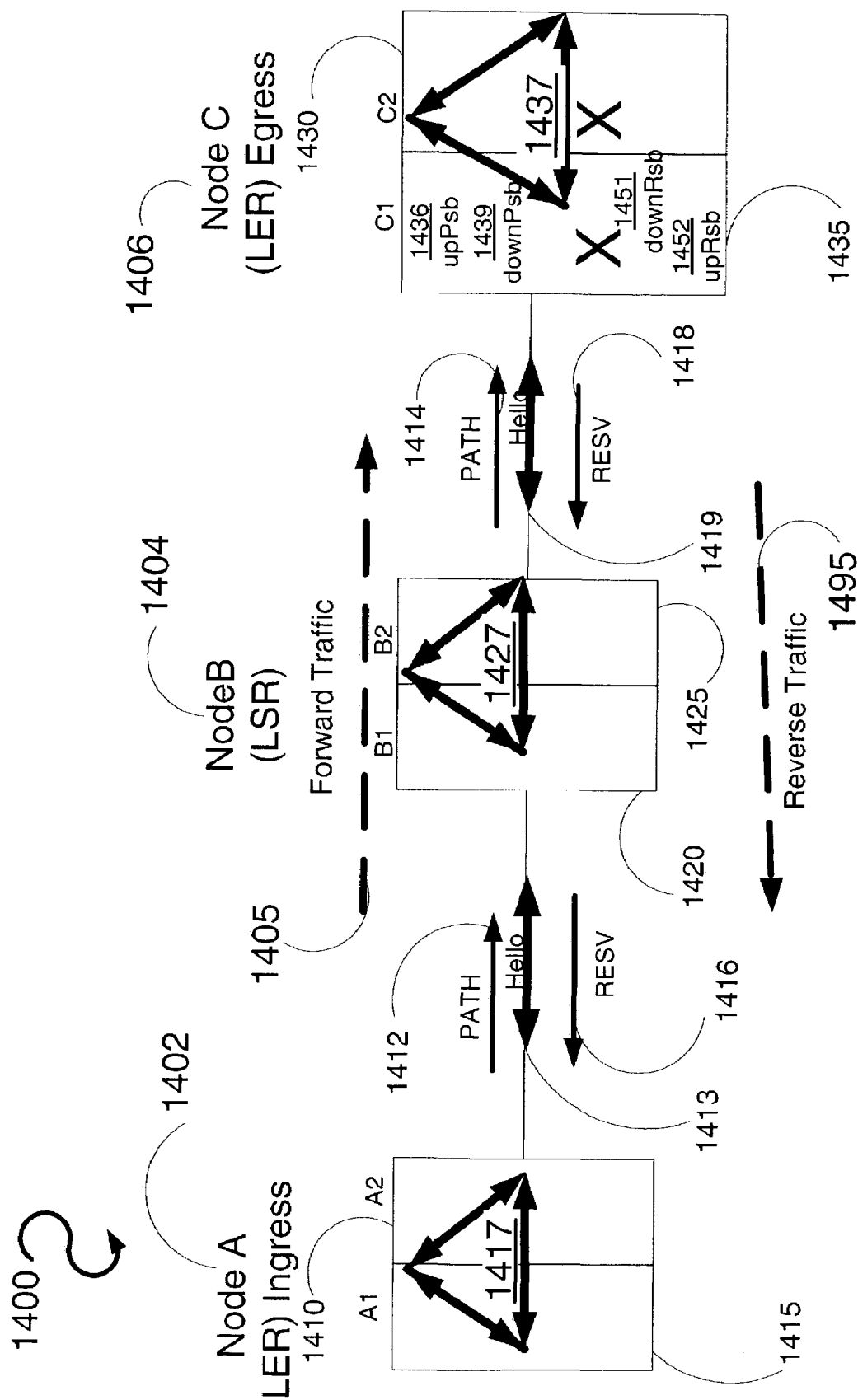
FIG. 14 is a diagram illustrating a packet walkthrough in MPLS network when an egress edge node restarts in accordance with another embodiment of the invention.

FIG. 14 shows an egress edge node restarts and a packet walkthrough 1400 for an LSP that is setup and passes through number of nodes, Node A 1402, Node B 1404, and Node C 1406. Node A 1402 and Node C 1406 are ingress and egress LERs (label edge router), respectively, and Node B 1404 is an LSR (label switching router). The forward direction of traffic 1405 is from Node A 1402 to Node C 1406 and the reverse traffic direction 1495 is from Node C 1406 to Node A 1402. Card C₁ 1435 MPLS control plane and Card C₂ 1430 MPLS control plane are restarted on an LER (label edge router) Node C 1406. Card B₂ 1425 recognizes that Card C₁ 1435 MPLS control plane has gone down via the Hello messaging 1419 between nodes, stops sending PATH refresh, and also cancels its RESV refresh timeouts. Card B₂ 1425 recognizes that Card C₁ 1435 MPLS control plane is back up via the Hello messaging 1419 between nodes. Card B₂ 1425 sends a PATH message 1414 to Card C₁ 1435 with same UPSTREAM_LABEL object that as before restart; Card C₁ 1435 recreates its control plane reverse outLabel entry and binds the entry to the data plane upPsb table 1436. To do the binding it searches the data plane upPsb table 1436 for reverse traffic outLabel entry that matches the UPSTREAM_LABEL just received. It recreates the control plane reverse traffic inLabel entry for the downPsb table 1439 on the same card. However, as there is no corresponding data plane entry, no binding-or matching search is undertaken. Card C₁ 1435 notifies Card C₂ 1430 that a new PATH message has been recreated and passes a table pointer to the reverse traffic outLabel which it retrieved from the data plane. Card C₂ 1430 informs Card C1 1435 when it has recreated its state for this LSP and passes a pointer to this LSPs data plane forward traffic entry. The control plane forward traffic outLabel entry is then created on Card C₁ 1435 for downRsb table 1451. As there is no corresponding data plane entry, no bind or matching search is undertaken. Card C₁ 1435 then creates the control plane forward traffic inLabel entry in the upRsb table 1452 and binds this to the corresponding entry in the data plane upRsb table 1452. The bind is accomplished by searching the data plane forward traffic pointer entry in the upRsb table 1452 against the pointer to this LSPs data plane forward traffic entry as forwarded by Card C₂ 1430. Card C₁ 1435 sends the RESV message 1418 to Card B₂ 1425 with the LABEL object containing the forward traffic inLabel value for the entry discovered during the binding of the upRsb table 1452.

Figure 15:
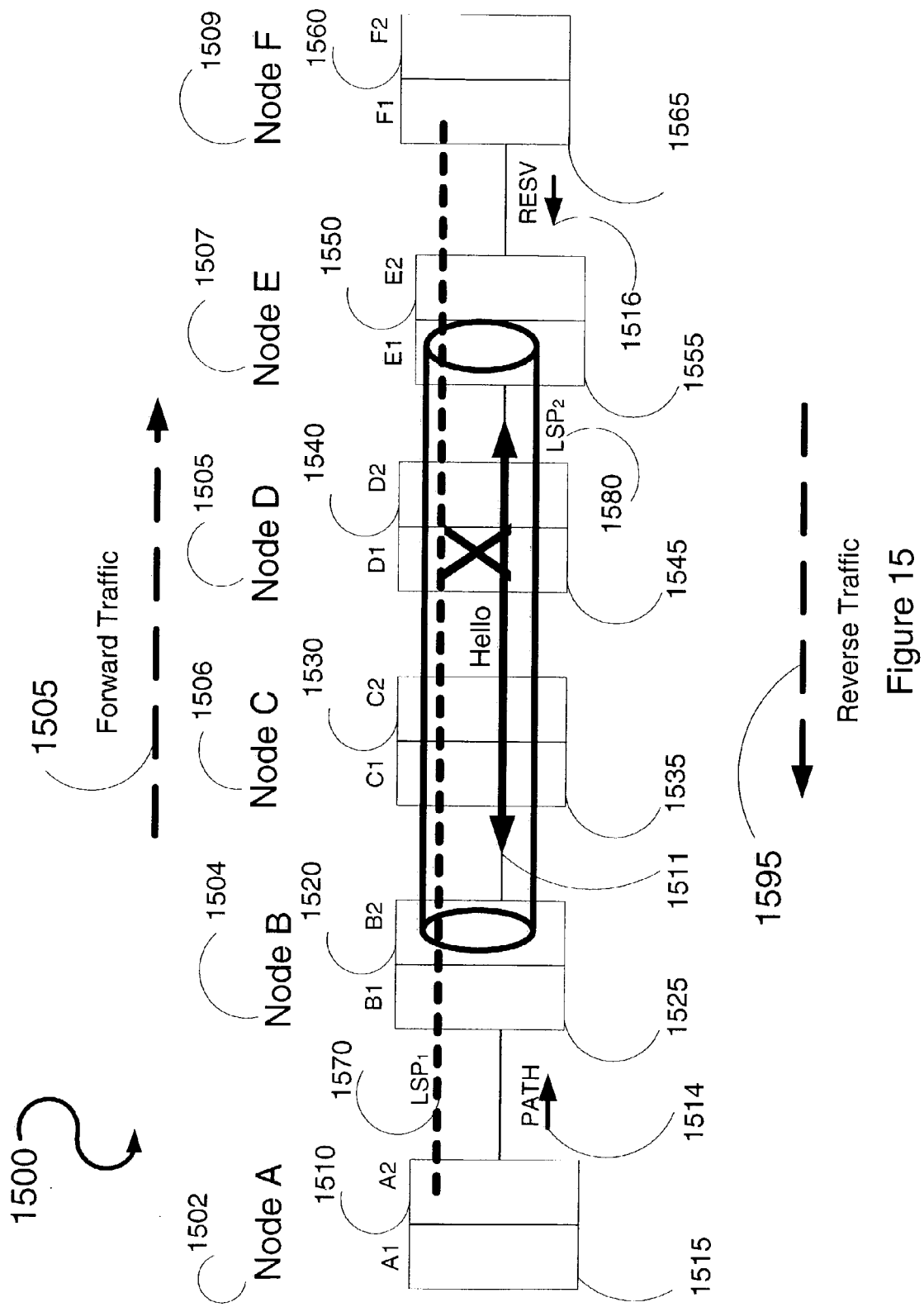
FIG. 15 is a diagram illustrating a packet walkthrough in MPLS network when a core node in a tunnel restarts in accordance with another embodiment of the invention.

FIG. 15 shows a packet walkthrough 1500 for an LSP that is setup and passes through at number of nodes and Node A 1502, Node B 1504, Node C 1506, Node D 1505, Node E 1507, and Node F 1509 are shown. Node A 1502 and Node F 1509 are ingress and egress LERs (label edge router), respectively. The forward direction of traffic 1505 is from Node A 1502 to Node F 1509 and the reverse traffic direction 1595 is from Node F 1509 to Node A 1502. An FA-LSP LSP₂ 1580 is between Node B 1504 and Node E 1507. There is a service LSP (LSP₁) 1570 that travels from Node A 1502 to Node F 1509 and rides over the FA-LSP LSP₂ 1580. Card D1 1545 MPLS control plane is restarted. As far as LSP₂ 1580 is concerned, Card D1 1545 recreates its state as described in the 600 packet walkthrough and shown in FIG. 6. As far as LSP₁ 1570 is concerned, if LSP₂ 1580 looks like an interface, then Hello messages 1511 run between Node B 1504 and Node E 1507 over LSP₂ 1580. Thus, Card B2 1520 detects that it cannot communicate with Card E1 1555 via the Hello messaging 1511 and disables the generation of refresh messages and refresh timeouts for LSP, 1570 between Card B2 1520 and Card E1 1555. When Card D1 1545 is up, the Hello messaging 1511 between Node B 1504 and Node E 1507 indicates that communication is restored. Via the instance values in the Hello message 1511, Card B2 1520 detects that it could not talk to Card E1 1555 because of communication link loss and not a restart. As such, there is no need to recreate RSVP state or any binding to the data plane at Node B 1504. Node B 1504 only enables its refresh messaging and refresh timeouts with Card E1 1555.

Figure 16:
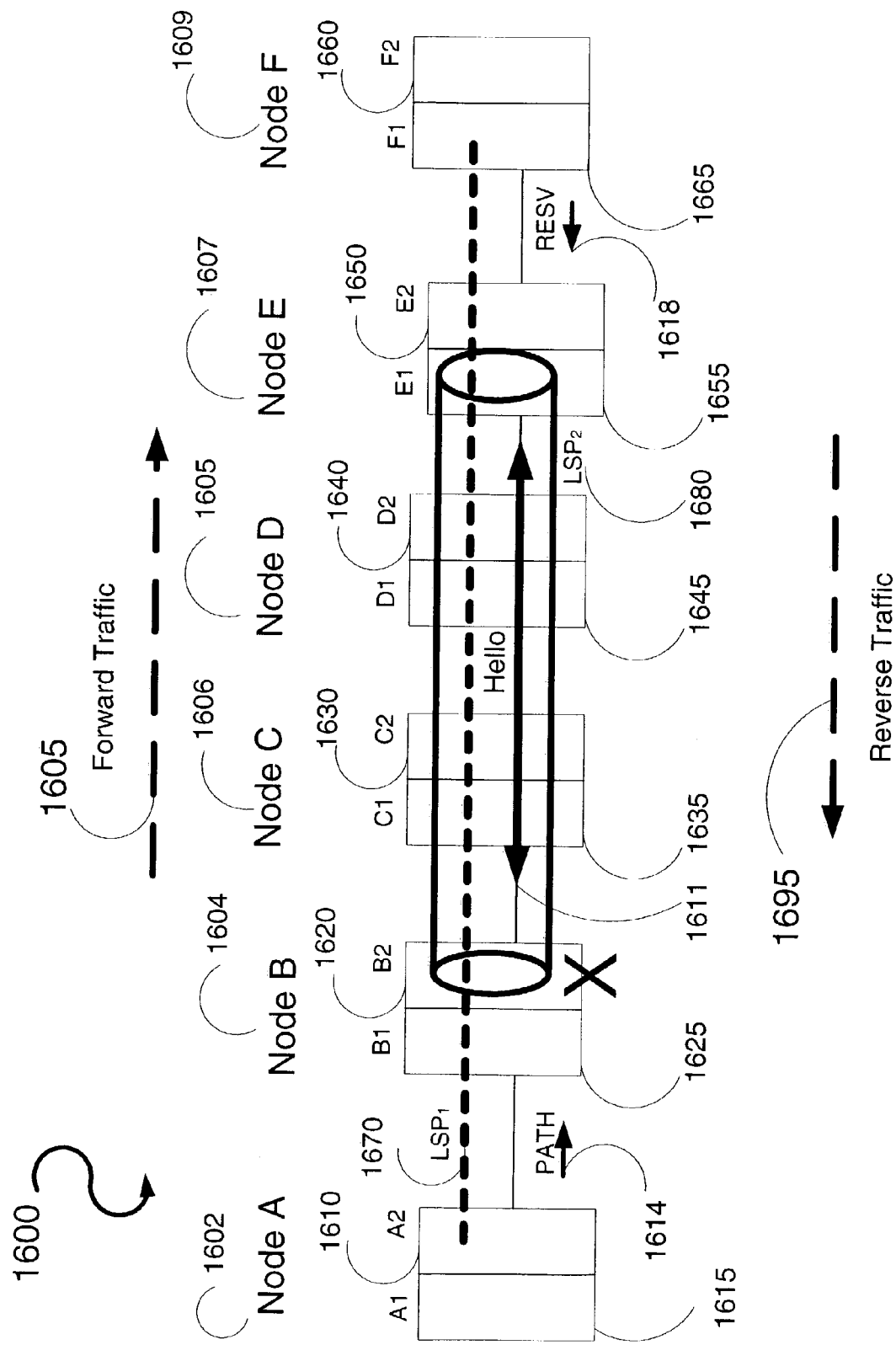
FIG. 16 is a diagram illustrating a packet walkthrough in MPLS network when a core node at the ingress of a tunnel restarts in accordance with yet another embodiment of the invention.

FIG. 16 shows a packet walkthrough 1600 for an LSP that is setup and passes through number of nodes, Node A 1602, Node B 1604, Node C 1606, Node D 1605, Node E 1607, and Node F 1609. Node A 1602 and Node F 1609 are ingress and egress LERs (label edge router), respectively. The forward direction of traffic 1605 is from Node A 1602 to Node F 1609 and the reverse traffic direction 1695 is from Node F 1609 to Node A 1602. An FA-LSP LSP₂ 1680 is between Node B 1604 and Node E 1607. There is a service LSP (LSP₁) 1670 that travels from Node A 1602 to Node F 1609 and rides over the FA-LSP LSP₂ 1680. Card B2 MPLS control plane is restarted. As far as LSP₂ 1680 is concerned, Card B2 1620 recreates its state as described in the 15 800 packet walkthrough and shown in FIG. 8 for ingress LER. For LSP₁ 1670 Card E1 1655 detects that LSP₂ 1680 is down via Hello messaging 1611 over the FA-LSP and thus disables its refresh until Card B2 1620 MPLS control plane comes up. For LSP₁ 1670 Card B2 1620 recreates its state and binds it to the data plane as described and shown in FIG. 6.

Thus, the embodiments of the present invention provide new and improved system and methods for hitless graceful restart for distributed RSVP-TE in a MPLS telecommunications networks.

It will be apparent to those with skill in the art that modifications to the above methods and embodiments can occur without deviating from the scope of the present invention. Accordingly, the disclosures and descriptions herein are intended to be illustrative of, but not limiting to, the scope of the invention which is set forth in the following claims.

What is claimed is:

1. A system for distributed resource reservation protocol-traffic engineering (RSVP-TE) hitless graceful restart for a multi-protocol label switching (MPLS) network, the system comprising:

a plurality of ingress cards and egress cards, each ingress card and each egress card having an MPLS control plane forwarding table for reverse and forward traffic outgoing and incoming labels for Label Switched Paths in the MPLS network;

a plurality of ingress card data planes and egress card data planes, each ingress card data plane and each egress card data plane having said forwarding table stored thereon; and a means for providing messaging comprising:
  means, at each ingress card MPLS control plane, for providing Hello messages for detecting a restart status of any egress card MPLS control plane;
  means for searching, updating, and binding the forwarding table stored on each ingress card data plane; and
  means for searching, updating, and binding forwarding tables stored on each egress card MPLS control plane; and
  means, at each egress card MPLS control plane, for providing Hello messages for detecting a restart status of any ingress card MPLS control plane;
  means for searching, updating, and binding the forwarding table stored on each egress card data plane; and
  means for searching, updating, and binding the forwarding tables stored on each ingress card MPLS control plane.

2. The system of claim 1 wherein each of the forwarding table stored on each egress card data plane and the forwarding table stored on each ingress card data plane comprises:
  a reverse traffic outgoing label table (upPsb table) having a reverse traffic outLabel entry for sending reverse traffic;
  a reverse traffic incoming label table (downPsb table) having a reverse traffic inLabel entry for receiving the reverse traffic;
  a forward traffic outgoing label table (downRsb table) having a forward traffic outLabel entry for sending forward traffic; and
  a forward traffic incoming label table (upRsb table) having a forward traffic inLabel entry for receiving the forward traffic.

3. The system of claim 2, wherein the reverse traffic incoming label table (downPsb table) further comprises:
  a reverse traffic out interface entry for identifying the reverse traffic output interface on the system; and
  a reverse traffic pointer entry for pointing to at least one of:
    the reverse traffic out interface entry in the downPsb table;
    the reverse traffic inLabel entry in the downPsb table; and
    the reverse traffic outLabel entry in the upPsb table.

4. The system of claim 2, wherein the forward traffic incoming label table (upRsb table) further comprises:
  a forward traffic out interface entry for identifying the forward traffic output interface on the system; and
  a forward traffic pointer entry for pointing to at least one of:
    the forward traffic out interface entry in the upRsb table;
    the forward traffic inLabel entry in the upRsb table; and
    the forward traffic outLabel entry in the downRsb table.

5. A multi-protocol label switching (MPLS) network having a plurality of nodes, each node comprising:

a plurality of ingress cards and egress cards, each ingress card and each egress card having an MPLS control plane forwarding table for reverse and forward traffic outgoing and incoming labels for Label Switched Paths in the MPLS network;

a plurality of ingress-card data planes and egress-card data planes, each ingress-card data plane and each egress-card data plane having said forwarding table stored thereon; and a means for providing messaging between ingress card MPLS control planes, ingress card data planes, egress card MPLS control planes, and egress card data planes;

wherein the forwarding table comprises:
  a reverse traffic outgoing label table (upPsb table) having a reverse traffic outLabel entry for sending reverse traffic;
  a reverse traffic incoming label table (downPsb table) having a reverse traffic inLabel entry for receiving the reverse traffic;
  a forward traffic outgoing label table (downRsb table) having a forward traffic outLabel entry for sending forward traffic; and
  a forward traffic incoming label table (upRsb table) having a forward traffic inLabel entry for receiving the forward traffic;

and wherein each node has means for generating:
  a PATH message having the reverse traffic outLabel entry for the upPsb table;
  a PATH message having the reverse traffic inLabel entry for the downPsb table;
  a RESV message having the forward traffic outLabel entry for the downRsb table; and
  an RESV message having the forward traffic inLabel entry for the upRsb table.

6. The MPLS network of claim 5, wherein said each node further comprises:
  means for exchanging of MPLS Hello messages with neighbouring nodes from among said plurality of nodes; and
  means for detecting a restart status of each of said neighbouring nodes.

7. The network of claim 5, further comprising:
  means for detecting a restart status of an individual node from among said plurality of nodes;
  means for recovering the forwarding table on the individual node in one of the following ways:
    from a neighbouring upstream core node in the network;
    from a neighbouring downstream core node in the network;
    from a neighbouring upstream ingress edge node in the network; and
    from a neighbouring downstream egress edge node in the network.

8. The MPLS network of claim 7, wherein the means for recovering the forwarding table on a core node, an ingress edge node, and an egress edge node recovers the upPsb, downPsb, downRsb and upRsb tables on the restarted core node, the restarted ingress edge node, and the restarted egress edge node.

9. The MPLS network of claim 8, wherein the means for recovering the forwarding table on the core node in the MPLS network comprises means for:
  creating the reverse traffic outLabel entry for the upPsb table, the reverse traffic outLabel entry being created by the ingress control plane on the core node;

binding the entries for the LSP with the forwarding tables on the ingress control plane and the ingress card data plane, the binding being performed by the ingress control plane on the core node;

searching the upPsb table for the label that matches the upstream label received from a neighbouring upstream node in the PATH message, the searching being performed by the ingress control plane on the core node;

recreating the reverse traffic inLabel entry for the downPsb table, the reverse traffic inLabel entry being created by the ingress control plane on the core node;

binding the reverse traffic inLabel entry to the downPsb table, the reverse traffic inLabel entry being determined by searching the upPsb table using the reverse traffic pointer entry for the reverse traffic outLabel entry, the binding being performed by the ingress control plane on the core node;

recreating the forward traffic outLabel entry for the downRsb table, the forward traffic outLabel entry being created by the egress control plane on the core node;

binding the forward traffic outLabel entry to the forwarding tables on the egress control plane and the egress card data plane by searching the downRsb table for a matching entry to the label object just received from a neighbouring downstream core node in the RESV message, the binding being performed by the egress control plane on the core node; and binding the upRsb table by searching for the forward traffic inLabel entry by matching the reverse traffic outLabel entry in the upPsb table received in the PATH message from a neighbouring upstream egress control plane on a neighbouring upstream core node, the binding being performed by the ingress control plane on the core node.

10. The MPLS network of claim 8, wherein the means for recovering of the forwarding table on the ingress edge node in the MPLS network comprises means for:

creating the reverse traffic outLabel entry for the upPsb table and forwarding the PATH message with said entry to the neighbouring downstream node, the reverse traffic outLabel entry being created by the egress control plane on the ingress edge node;

searching the downPsb table for reverse traffic incoming packets, the searching being performed by the egress control plane on the ingress edge node;

binding the reverse traffic inLabel entry in the downPsb table to the forwarding tables on the egress control plane and the egress card data plane, the binding being performed by the egress control plane on the ingress edge node; and binding the forward traffic outLabel entry in the downRsb table with the forwarding tables on the egress control plane and the egress card data plane by finding the corresponding entry in the downRsb table that matches the content of the label object in the RESV message received from the neighbouring downstream node, the binding being performed by the egress control plane on the ingress edge node.

11. The MPLS network of claim 8, wherein the means for recovering the forwarding table on the egress edge node in the MPLS network comprises means for:

creating the reverse traffic outLabel entry for the upPsb table, the reverse traffic outLabel entry being created by the ingress control plane on the egress edge node;

binding the reverse traffic outLabel entry to the upPsb table, the binding being performed by the ingress control plane on the egress edge node;

searching the upPsb table for reverse traffic outLabel entry that matches the upstream label just received from the neighbouring upstream node, the searching being performed by the ingress control plane on the egress edge node;

recreating the reverse traffic inLabel entry for the downPsb table, the reverse traffic inLabel entry being created by the ingress control plane on the egress edge node;

creating the forward traffic outLabel entry for the downRsb table, the forward traffic outLabel entry being created by the ingress control plane on the egress edge node;

creating the forward traffic inLabel entry for the upRsb table, the forward traffic inLabel entry being created by the ingress control plane on the egress edge node;

binding the entries for the LSP to the upRsb table and the forwarding tables on the ingress control plane and the ingress card data plane, the binding being performed by the ingress control plane on the egress edge node;

searching the forwarding table for the forward traffic inLabel entry in the upRsb table received from the neighbouring downstream node by matching the reverse traffic outLabel entry in the upPsb table, the searching being performed by the ingress control plane on the egress edge node; and binding the forwarding table with the forwarding tables on the ingress control plane and the ingress card data plane, the binding being performed by the ingress control plane on the egress edge node.

12. A method for providing distributed RSVP-TE (resource reservation protocol-traffic engineering) hitless graceful restart in a network node comprising a plurality of ingress cards, each ingress card having a respective ingress data plane and a respective ingress control plane; and a plurality of egress cards, each egress card having a respective egress data plane and a respective egress control plane, the method comprising the steps of:

detecting a restart status of an ingress control plane recovering the ingress control plane by recovering forwarding table on the ingress control plane in one of the following ways:

from an egress control plane on the same node;

from control plane on a neighbouring upstream core node in the network;

from control plane on a neighbouring downstream core node in the network;

from control plane on a neighbouring upstream ingress edge node in the network; and from control plane on a neighbouring downstream egress edge node in the network;

detecting a restart status of an egress control plane;

recovering the egress control plane by recovering the forwarding table on the egress control plane in one of the following ways:

from the ingress control plane on the same node;

from control plane on a neighbouring upstream core node in the network;

from control plane on a neighbouring downstream core node in the network;

from control plane on a neighbouring upstream ingress edge node in the network; and from control plane on a neighbouring downstream egress edge node in the network.

13. The method of claim 12, further comprising the steps of:
continuing communications between the egress control plane on the same node and the neighbouring upstream node and the neighbouring downstream node in the MPLS network; and
holding off communications between the neighbouring upstream node, the neighbouring downstream node, and the node including the restarted ingress control plane;
continuing communications between the ingress control plane on the same node and the neighbouring upstream node and the neighbouring downstream node in the MPLS network; and
holding off communications between the neighbouring upstream node, the neighbouring downstream node, and the node including the restarted egress control plane.

14. The method of claim 12, further comprising:
searching, updating, and binding recovered forwarding table on the ingress control plane with the forwarding tables on the egress control plane and the ingress data plane on the node; and
searching, updating, and binding recovered forwarding table on the egress control plane with the forwarding tables on the ingress control plane and the egress data plane on the node.

15. The method of claim 12, wherein each of the forwarding table on the ingress control plane and the forwarding table on the egress control plane comprises:
a reverse traffic outgoing label table (upPsb table) having a reverse traffic outLabel entry for sending reverse traffic;
a reverse traffic incoming label table (downPsb table) having a reverse traffic inLabel entry for receiving the reverse traffic;
a forward traffic outgoing label table (downRsb table) having a forward traffic outLabel entry for sending forward traffic; and
a forward traffic incoming label table (upRsb table) having a forward traffic inLabel entry for receiving the forward traffic;
and wherein the step of recovering the forwarding table on one of the ingress control plane and egress control plane comprises recovering the upPsb, downPsb, downRsb and upRsb tables on the restarted ingress control plane and the restarted egress control plane.

16. The method of claim 15, wherein the step of recovering the ingress control plane comprises recovering the ingress card on at least one of:
a core node in the MPLS network;
an ingress edge node in the MPLS network; and
an egress edge node in the MPLS network.

17. The method of claim 16, wherein the step of recovering the ingress card on the core node in the MPLS network further comprises the steps of:
creating the reverse traffic outLabel entry for upPsb table using the reverse traffic outLabel entry received in the PATH message from the neighbouring upstream node, the reverse traffic outLabel entry being created by the ingress control plane on the core node;
creating the forward traffic inLabel entry for upRsb table using the forward traffic outLabel entry in the downRsb table received from the egress control plane on the same core node, the forward traffic inLabel entry being created by ingress control plane on the core node;
searching the downRsb table for the forward traffic outLabel entry, which corresponds to the forward traffic inLabel entry in the upRsb table, the searching being performed by the ingress control plane on the core node;
updating the forwarding table with the forward traffic inLabel entry in the upRsb table, the updating being performed by the ingress control plane on the core node; and
binding the forward traffic inLabel entry in the upRsb table to the LSP and the forwarding table with the forwarding tables on the ingress control plane and the ingress card data plane, the binding being performed by the ingress control plane on the core node.

18. The method of claim 16, wherein the step of recovering the ingress card on the ingress edge node in the MPLS network further comprises the steps of:
creating the entries of the forwarding table, the entries being created by the ingress control plane on the ingress edge node; and
binding the forwarding table to the forwarding tables of the ingress control plane and the ingress card data plane, the binding being performed by the ingress control plane on the ingress edge node.

19. The method of claim 16, wherein the step of recovering the ingress card on the egress edge node in the MPLS network further comprises the steps of:
creating the reverse traffic outLabel entry for the upPsb table, the reverse traffic outLabel entry being created by the ingress control plane on the egress edge node;
creating the reverse traffic inLabel entry for the downPsb table for the LSP, the reverse traffic inLabel entry being created by the ingress card MPLS control plane on the egress edge node;
creating the forward traffic outLabel entry for the downRsb table and sending said entry to the ingress control plane on the same egress node, the forward traffic outLabel entry being created by the egress card MPLS control plane on the egress edge node;
creating the forward traffic inLabel entry for the upRsb table, the forward traffic inLabel entry being created by the ingress control plane on the egress edge node;
searching the upRsb table for the forward traffic pointer in the upRsb table that matches the forward traffic outLabel entry in the downRsb table, as passed in the RESV message received from the egress control plane on the same egress edge node, the searching being performed by the ingress control plane on the egress edge node; and
binding the entries of the forwarding table to the LSP and the forwarding table with the forwarding tables on the ingress control plane and ingress card data plane, the binding being performed by the ingress control plane on the egress edge node.

20. Method of claim 15, wherein the step of recovering the forwarding table on the egress control plane comprises recovering the egress card on at least one of the following:
a core node in the MPLS network;
an ingress edge node in the MPLS network; and
an egress edge node in the MPLS network.

21. Method of claim 20, wherein the step of recovering the egress card on the core node in the MPLS network further comprising the steps of:
creating the reverse traffic inLabel entry for the downPsb table for the LSP using the reverse traffic outLabel entry in the upPsb table received in the PATH message from the ingress control plane on the same core node, the reverse traffic inLabel entry being created by the egress control plane on the core node;

searching the downPsb table to find a match for the reverse traffic pointer entry received from the ingress control plane on the same core node, the searching being performed by the egress control plane on the core node;

binding the reverse traffic inLabel entry in the downPsb table to the forwarding tables on the egress control plane and the egress card data plane, the binding being performed by the egress control plane on the core node;

recreating the forward traffic outLabel entry for the downRsb table on receipt of RESV message from the ingress control plane on the same core node, the forward traffic outLabel entry being created by the egress control plane on the core node;

searching the downRsb table using the content of the label object in the RESV message, the searching being performed by the egress control plane on the core node; and binding the forward traffic outLabel entry to the downRsb table and the forwarding table to the forwarding tables on the egress control plane and the egress card data plane, the binding being performed by the egress control plane on the core node.

22. Method of 20, wherein the step of recovering the egress card on the ingress edge node in the MPLS network further comprising the steps of:

creating the reverse traffic outLabel entry for the upPsb table and forwarding the PATH message to the neighbouring downstream node, the reverse traffic outLabel entry being created by the egress control plane on the ingress edge node;

creating the reverse traffic inLabel entry for the downPsb table, the reverse traffic inLabel entry being created by the egress control plane on the ingress edge node;

searching the reverse traffic inLabel entry in the downPsb table for reverse traffic incoming packets, the searching being performed by the egress control plane on the ingress edge node;

binding the reverse traffic inLabel entry in the downPsb table to the forwarding tables on the egress control plane and the egress card data plane, the binding being performed by the egress control plane on the ingress edge node;

creating the forward traffic outLabel entry for the downRsb table for the LSP, the forward traffic outLabel entry being created by the egress control plane on the ingress edge node; and binding the forward traffic outLabel entry in the downRsb table with the forwarding tables on the egress control plane and the egress card data plane when the corresponding entry in the downRsb table is found, the binding being performed by the egress control plane on the ingress edge node.

23. Method of 20, wherein the step of recovering the egress card on the egress edge node in the MPLS network further comprising the steps of:

creating the entries for the forwarding table, the entries being created by the egress control plane on the egress edge node; and binding the forwarding table with the forwarding tables on the egress control plane and the egress card data plane, the binding being performed by the egress control plane on the egress edge node.

24. The method of claim 12, wherein the step of recovering the forwarding table on one of the ingress control plane and egress control plane comprises exchanging Hello messages between an ingress control plane and an egress control plane.

* * * * *